US010804022B2

(12) United States Patent
Ishida et al.

(10) Patent No.: US 10,804,022 B2
(45) Date of Patent: Oct. 13, 2020

(54) COIL COMPONENT

(71) Applicant: Murata Manufacturing Co., Ltd., Kyoto-fu (JP)

(72) Inventors: Takuya Ishida, Nagaokakyo (JP); Gota Shinohara, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 28 days.

(21) Appl. No.: 15/829,409

(22) Filed: Dec. 1, 2017

(65) Prior Publication Data
US 2018/0308613 A1 Oct. 25, 2018

(30) Foreign Application Priority Data

Apr. 19, 2017 (JP) .................................. 2017-083125

(51) Int. Cl.
*H01F 27/02* (2006.01)
*H01F 17/04* (2006.01)
(Continued)

(52) U.S. Cl.
CPC .............. *H01F 17/043* (2013.01); *B22F 1/02* (2013.01); *B22F 7/06* (2013.01); *B29B 7/90* (2013.01); *B29C 43/003* (2013.01); *B29C 43/52* (2013.01); *C09D 163/00* (2013.01); *C22C 32/0015* (2013.01); *C22C 33/02* (2013.01); *H01F 3/10* (2013.01); *H01F 17/04* (2013.01); *H01F 17/045* (2013.01); *H01F 27/02* (2013.01); *H01F 27/2852* (2013.01); *H01F 27/29* (2013.01); *H01F 27/30* (2013.01);
(Continued)

(58) Field of Classification Search
CPC .............................. H01F 5/00; H01F 27/00–40
USPC ............ 336/65, 83, 212, 220–223, 232–234
See application file for complete search history.

(56) References Cited

U.S. PATENT DOCUMENTS 6,392,525 B1 * 5/2002 Kato .......................... H01F 3/08
336/200
7,427,909 B2 * 9/2008 Ono ...................... H01F 1/1475
336/90
(Continued)

FOREIGN PATENT DOCUMENTS

CN          1627457 A        6/2005
JP       H04206705 A         7/1992
(Continued)

OTHER PUBLICATIONS

An Office Action; "Notification of Reasons for Refusal," Mailed by the Japanese Patent Office dated Jul. 16, 2019, which corresponds to Japanese Patent Application No. 2017-083125 and is related to U.S. Appl. No. 15/829,409; with English language translation.

*Primary Examiner* — Tuyen T Nguyen
(74) *Attorney, Agent, or Firm* — Studebaker & Brackett PC

(57) ABSTRACT

A coil component includes a magnetic portion that includes metal particles and a resin material, a coil conductor embedded in the magnetic portion and having a core portion, and outer electrodes electrically connected to the coil conductor. The magnetic portion includes an outer coating and a magnetic base having a protrusion portion. The protrusion portion is inserted into the core portion. The filling factor of the metal particles in the magnetic base is higher than the filling factor of the metal particles in the outer coating.

19 Claims, 6 Drawing Sheets

(51) Int. Cl.
- *B22F 1/02* (2006.01)
- *B29B 7/90* (2006.01)
- *B29C 43/00* (2006.01)
- *B29C 43/52* (2006.01)
- *C09D 163/00* (2006.01)
- *B22F 7/06* (2006.01)
- *C22C 33/02* (2006.01)
- *C22C 32/00* (2006.01)
- *H01F 27/28* (2006.01)
- *H01F 3/10* (2006.01)
- *H01F 27/29* (2006.01)
- *H01F 27/30* (2006.01)
- *C08K 3/11* (2018.01)
- *H01F 41/02* (2006.01)
- *B29K 63/00* (2006.01)
- *B29K 105/16* (2006.01)
- *B29K 505/12* (2006.01)
- *B29L 31/00* (2006.01)
- *B22F 5/00* (2006.01)

(52) U.S. Cl.
CPC ..... *B22F 2005/005* (2013.01); *B22F 2301/35* (2013.01); *B29K 2063/00* (2013.01); *B29K 2105/16* (2013.01); *B29K 2505/12* (2013.01); *B29K 2995/0008* (2013.01); *B29L 2031/711* (2013.01); *C08K 3/11* (2018.01); *C22C 2202/02* (2013.01); *H01F 41/0246* (2013.01); *H01F 2003/106* (2013.01); *H01F 2017/048* (2013.01)

(56) References Cited

U.S. PATENT DOCUMENTS

| | | | | |
|---|---|---|---|---|
| 7,859,377 B2 * | 12/2010 | Kawarai | ............ | H01F 17/0006 336/83 |
| 8,327,524 B2 * | 12/2012 | Brunner | ................ | H01F 27/255 29/602.1 |
| 8,390,415 B2 * | 3/2013 | Ogawa | ...................... | H01F 1/26 336/192 |
| 8,466,764 B2 * | 6/2013 | Bogert | .................... | H01F 5/003 336/83 |
| 9,589,716 B2 * | 3/2017 | Doljack | ................... | H01F 17/04 |
| 9,859,043 B2 * | 1/2018 | Yan | ............................ | H01F 1/26 |
| 2002/0097124 A1 * | 7/2002 | Inoue | ........................ | H01F 1/24 336/83 |
| 2006/0119461 A1 | 6/2006 | Kawarai | | |
| 2007/0132533 A1 * | 6/2007 | Shiu | .................... | H01F 41/0246 336/83 |
| 2012/0188040 A1 | 7/2012 | Ogawa et al. | | |
| 2013/0249662 A1 * | 9/2013 | Tonoyama | ............ | H01F 27/255 336/200 |
| 2014/0132387 A1 * | 5/2014 | Shin | ......................... | H01F 1/33 336/200 |
| 2014/0167897 A1 * | 6/2014 | Choi | ..................... | H01F 27/255 336/83 |
| 2014/0259640 A1 * | 9/2014 | Sakamoto | ............. | H01F 27/022 29/602.1 |
| 2015/0028983 A1 | 1/2015 | Ryu et al. | | |
| 2016/0314889 A1 | 10/2016 | Ryu et al. | | |

FOREIGN PATENT DOCUMENTS

| | | | | | |
|---|---|---|---|---|---|
| JP | 2001-068324 | A | | 3/2001 | |
| JP | 2006-041173 | A | | 2/2006 | |
| JP | 2006041173 | A | * | 2/2006 | ........... H01F 17/045 |
| JP | 2011-035005 | A | | 2/2011 | |
| JP | 2015-026812 | A | | 2/2015 | |
| JP | 2016-201466 | A | | 12/2016 | |
| JP | 2016-208002 | A | | 12/2016 | |
| JP | 2016208002 | A | * | 12/2016 | ........... H01F 27/255 |

* cited by examiner

COIL COMPONENT

CROSS-REFERENCE TO RELATED APPLICATION

This application claims benefit of priority to Japanese Patent Application No. 2017-083125, filed Apr. 19, 2017, the entire content of which is incorporated herein by reference.

BACKGROUND

Technical Field

The present disclosure relates to a coil component, specifically a coil component including a magnetic portion, a coil conductor embedded in the magnetic portion, and outer electrodes disposed outside the magnetic portion.

Description of the Related Art

Japanese Unexamined Patent Application Publication No. 2016-201466 discloses a coil component including a magnetic portion and a coil conductor embedded in the magnetic portion. The coil component is made of a composite material including metal particles and a resin material.

SUMMARY

The above-described coil component is made by preparing sheets of a composite material containing metal particles and a resin material, disposing a coil on at least one of the sheet, overlapping the other sheets on the coil, and compression molding them. The coil component is required to have large inductance, and in order to obtain large inductance, the magnetic permeability of the magnetic portion, especially of the core portion, has to be enhanced. In order to enhance the magnetic permeability of the magnetic portion of the coil component made of a composite material including metal particles and a resin material, it is preferable that the filling factor of the metal particles in the magnetic portion be maximized. However, in order to improve magnetic permeability, great pressure in compression molding may cause deformation of the coil, so it is difficult to increase the filling factor of metal particles for the purpose of obtaining high magnetic permeability.

It is an object of the present disclosure to provide a coil component in which a coil conductor is embedded in a magnetic portion including metal particles and a resin material and which has a high filling factor of metal particles in the magnetic portion.

In order to solve the above-described problems, the present inventors performed intensive investigations. As a result, it was found that the magnetic permeability of a coil component could be increased by using an outer coating and a magnetic base having a protrusion portion inserted into a core portion of a coil conductor, the magnetic base having a high filling factor.

According to preferred embodiments of the present disclosure, a coil component includes a magnetic portion that includes metal particles and a resin material, a coil conductor embedded in the magnetic portion, and outer electrodes electrically connected to the coil conductor. The magnetic portion includes an outer coating and a magnetic base having a protrusion portion, and the protrusion portions is inserted into a core portion of the coil conductor and the outer coating covers the coil conductor. The filling factor of the metal particles in the protrusion portion is higher than the filling factor of the metal particles in the outer coating.

According to the present disclosure, the coil component can give high inductance by that the magnetic portion base has the outer coating and the magnetic base having the protrusion portion, and that filling factor of the magnetic base is increased.

DETAILED DESCRIPTION

A coil component according to preferred embodiments of the present disclosure will be described below in detail with reference to the drawings. In this regard, the shapes, arrangements, and the like of the coil component and constituents according to the present embodiments are not limited to the illustrated examples.

Figure 1:
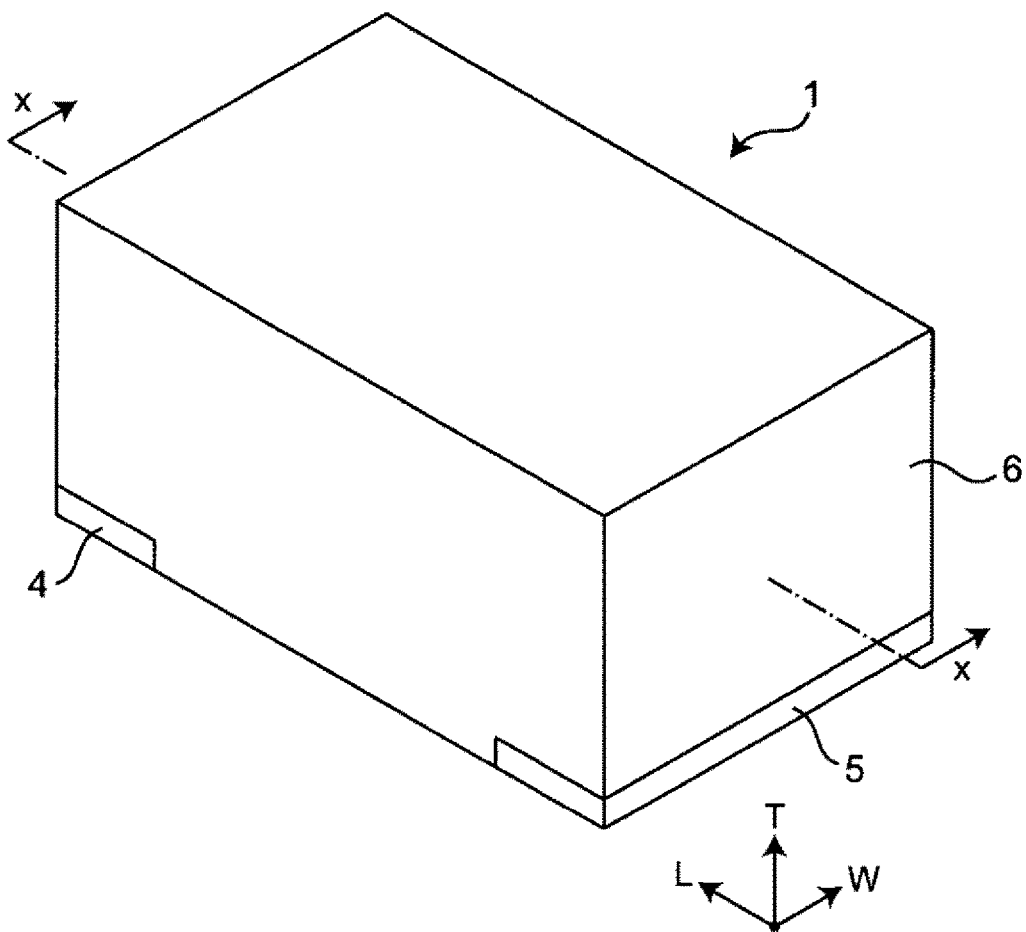
FIG. 1 is a perspective view schematically showing a coil component according to an exemplary embodiment of the present disclosure.
Figure 2:
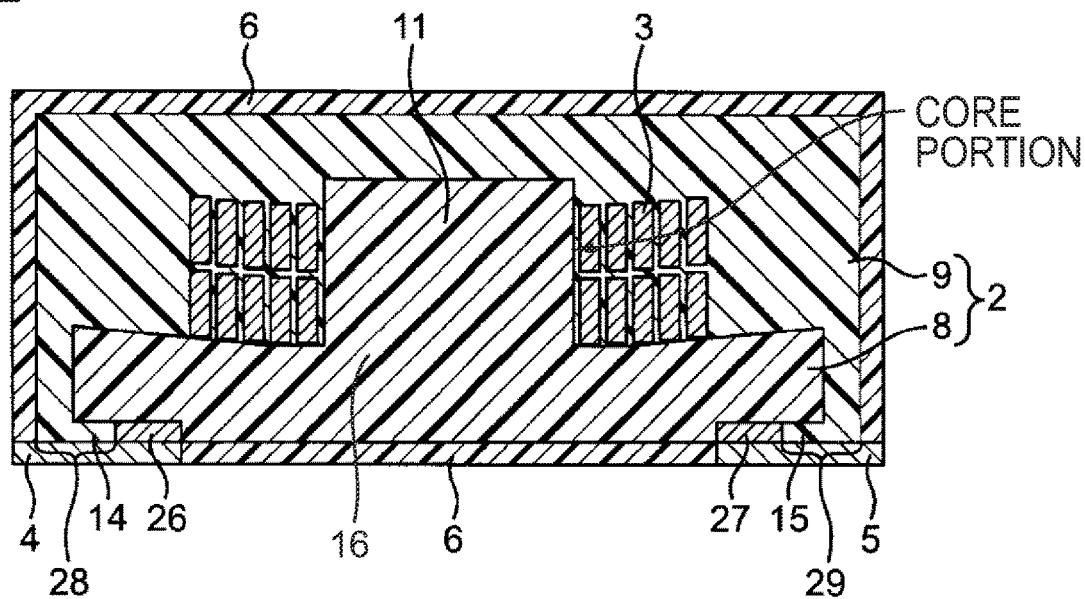
FIG. 2 is a sectional view of a cross section along a line x-x of the coil component shown in FIG. 1.
Figure 3:
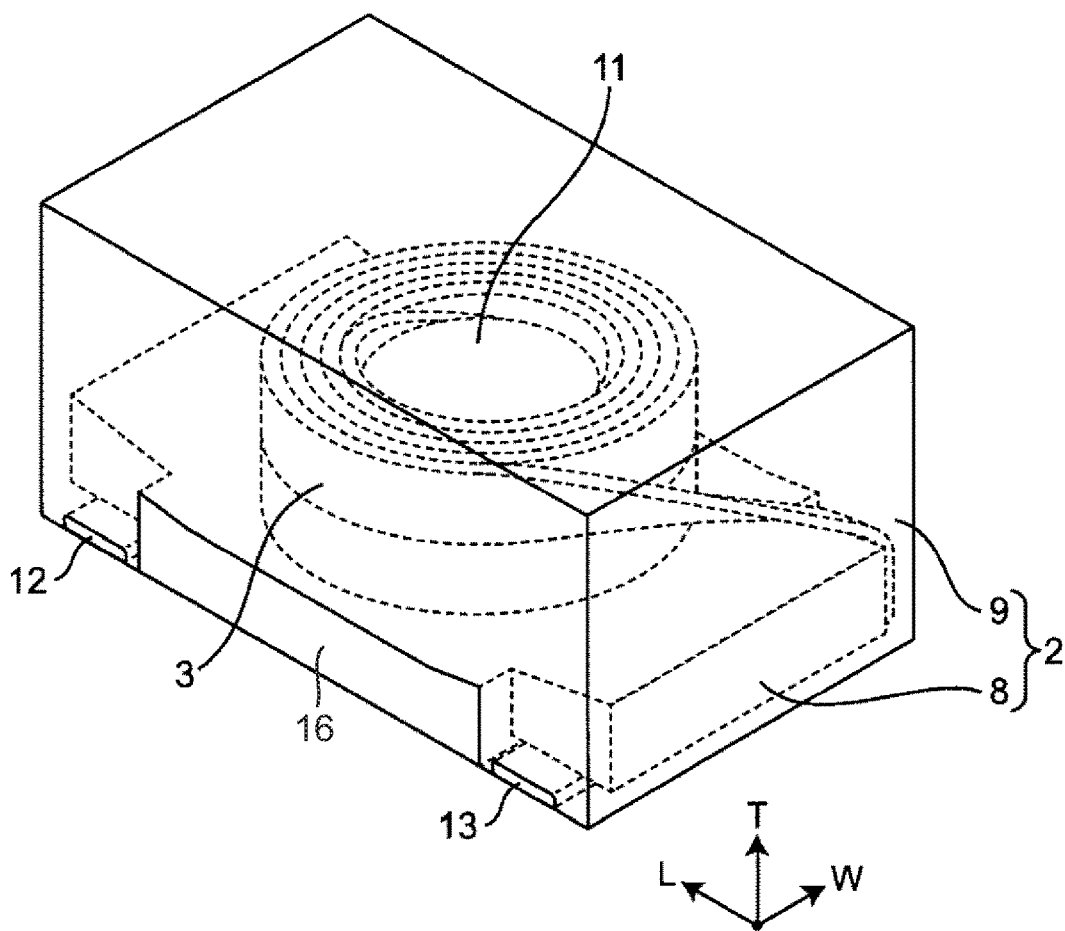
FIG. 3 is a perspective view of a magnetic portion, in which a coil conductor is embedded, of the coil component shown in FIG. 1.
Figure 4:
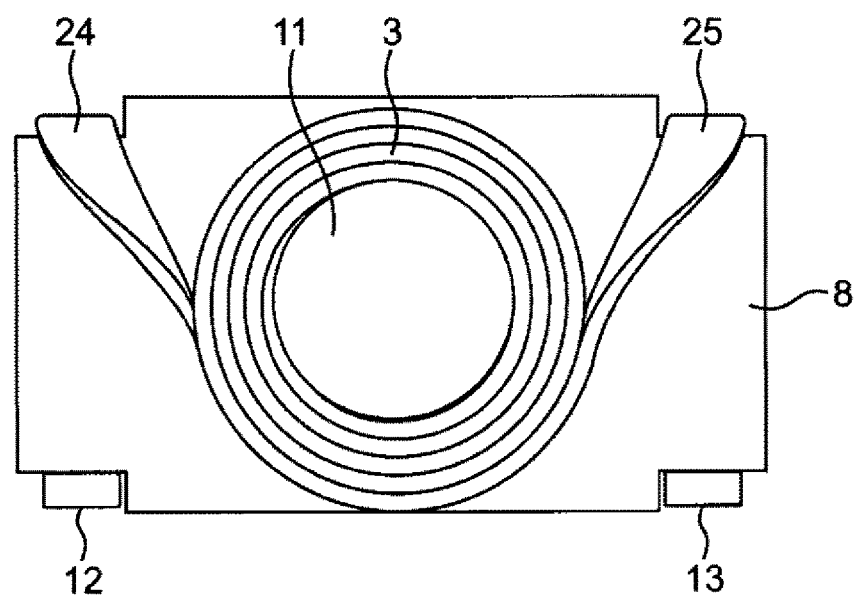
FIG. 4 is a plan view of a magnetic base provided with the coil conductor of the coil component shown in FIG. 1.

The perspective view of a coil component 1 according to the present embodiment is schematically shown in FIG. 1, and the sectional view is schematically shown in FIG. 2. The perspective view of a magnetic portion 2, in which a coil conductor 3 of the coil component 1 is embedded, is schematically shown in FIG. 3. Further, the plan view of a magnetic base 8 provided with the coil conductor 3 of the coil component 1 is schematically shown in FIG. 4. In this regard, the shapes, arrangements, and the like of the coil component 1 and constituents according to the following embodiment are not limited to the illustrated examples.

As shown in FIG. 1 and FIG. 2, the coil component 1 according to the present embodiment has a substantially rectangular parallelepiped shape. Regarding the coil component 1, the left-side and right-side surfaces of the drawing shown in FIG. 2 are referred to as "end surfaces", the upper-side surface of the drawing is referred to as an "upper surface", the lower-side surface of the drawing is referred to as a "bottom surface", the near-side surface of the drawing is referred to as a "front surface", and the far-side surface of the drawing is referred to as a "back surface". The coil component 1 includes the magnetic portion 2, the coil conductor 3 embedded in the magnetic portion 2, and a pair of outer electrodes 4 and 5. As shown in FIG. 2 and FIG. 3, the magnetic portion 2 is composed of the magnetic base 8 and the magnetic outer coating 9. Regarding each of the magnetic portion 2, the magnetic base 8, and the magnetic outer coating 9, the left-side and right-side surfaces of the drawing shown in FIG. 2 are referred to as "end surfaces", the upper-side surface of the drawing is referred to as an "upper surface", the lower-side surface of the drawing is referred to as a "bottom surface", the near-side surface of the drawing is referred to as a "front surface", and the far-side surface of the drawing is referred to as a "back surface". As shown in FIG. 2 to FIG. 4, the magnetic base 8 includes a base portion 16 and a protrusion portion 11 on an upper surface of the base portion 16. The front surface, the bottom surface, and the back surface of the magnetic base 8 are provided with grooves 14 and 15 in contact with both the end surfaces. The coil conductor 3 is arranged on the magnetic base 8 such that the coil conductor 3 is wound around the protrusion portion 11 of the magnetic base 8. Thus, the protrusion portion 11 is located in a core portion of the coil conductor 3, which is a space or cavity surrounded by wire that constitutes the coil conductor 3. Extension portions 24 and 25 of the coil conductor 3 extend from the upper surface of the magnetic base 8 to the bottom surface via the back surface and along the grooves 14 and 15 of the back surface and the bottom surface of the magnetic base 8. The ends 12 and 13 of the coil conductor 3 extend to the front surface or the vicinity of the front surface of the magnetic base 8. The magnetic outer coating 9 is disposed on the magnetic base 8 so as to cover the coil conductor 3. The end portions 26 and 27, which are parts of the extension portions 24 and 25, respectively, of the coil conductor 3, are exposed at the bottom surface of the magnetic portion 2. The outer electrodes 4 and 5 are disposed on the bottom surface of the magnetic portion 2 and are electrically connected to the end portions 26 and 27, respectively, of the coil conductor 3. The coil component 1 excluding the outer electrodes 4 and 5 is covered with a protective layer 6.

In the present specification, the length of the coil component 1 is denoted as "L", the width is denoted as "W", and the thickness (height) is denoted as "T" (Refer to FIG. 1, which shows directions L, T, and W in which the length L, width W, and thickness (height) T of the coil component 1 are determined). In the present specification, a plane parallel to the front surface and the back surface is denoted as "LT plane", a plane parallel to the end surfaces is denoted as "WT plane", and a plane parallel to the upper surface and the bottom surface is denoted as "LW plane".

Figure 5:
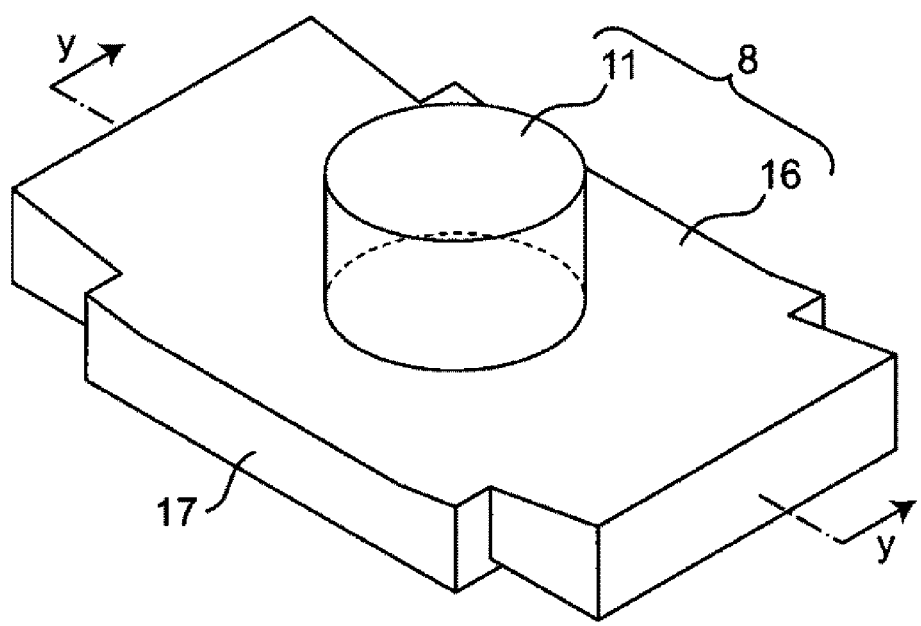
FIG. 5 is a perspective view of the magnetic base of the coil component shown in FIG. 1.
Figure 6:
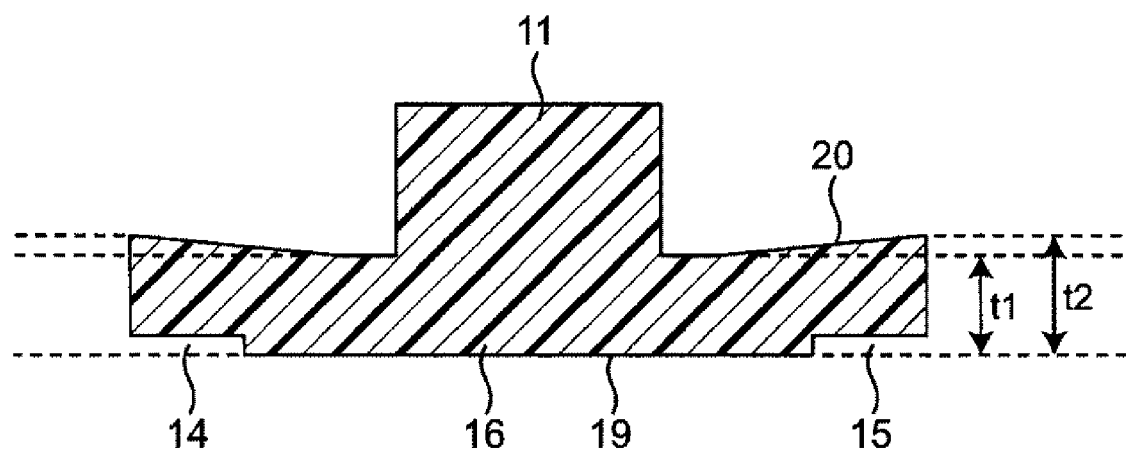
FIG. 6 is a sectional view of a cross section along a line y-y of the magnetic base shown in FIG. 5.
Figure 7:
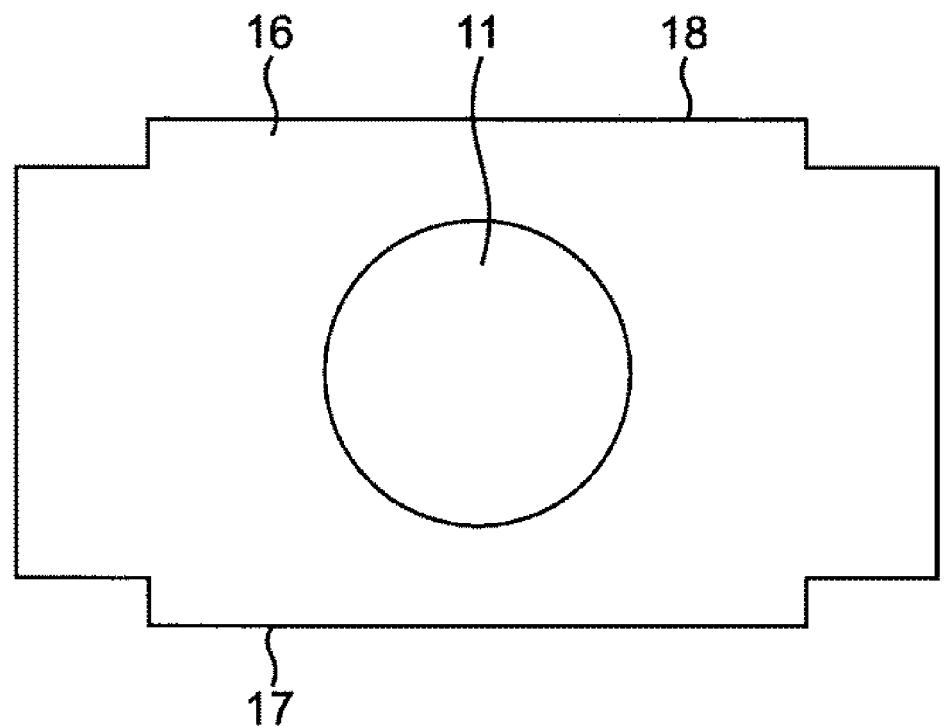
FIG. 7 is a plan view of the magnetic base shown in FIG. 5.

As described above, the magnetic portion 2 has the magnetic base 8 and the magnetic outer coating 9. As shown in FIG. 5 to FIG. 7, the magnetic base 8 includes a base portion 16 and the protrusion portion 11 disposed on the base portion 16. The base portion 16 and the protrusion portion 11 are integrally formed, in this example, as one piece and of a same material. Both end portions (left and right ends in FIG. 6) of the base portion 16 have grooves 14 and 15 that are located over the front surface 17, the bottom surface 19, and the back surface 18. The edge at a periphery of the upper surface 20 of the base portion 16 (or simply referred to as the edge of the base portion 16) is higher in the thickness direction T than the central portion of the base portion 16 near protrusion portion 11. That is, the edges of at the both end portions of the upper surface 20 are located at positions higher in the thickness direction T (that is, upper in FIG. 6), than the position at which the edge of the protrusion portion 11 which is in contact with the upper surface 20 is located.

As described above, in the magnetic base 8, at least part of the edge at a periphery of the upper surface 20 of the base portion 16 is located at the position higher in the thickness direction T than a position at which the edge of the protrusion portion 11 contacts the upper surface 20. That is, in FIG. 6, t2 is larger than t1, wherein t1 is a height of a portion at which the protrusion portion 11 is in contact with the base portion 16 and t2 is a height of the edge of the base portion 16 from the lower surface 19 of the magnetic base 8. The above-described edge located at a position whose height is higher than a position of the upper surface at the edge of the protrusion portion 11 may be edges of the both end portions or be edges of the front surface and the back surface. Preferably, the entire edge of the base portion 16 is located at a position higher in the thickness direction T than the location of the position at which the edge of the protrusion portion 11 contacts the upper surface 20 of the base portion 16. In the case where the edge of the base portion 16 is higher in the thickness direction T than the central portion thereof, it becomes easier to position the coil conductor 3. In the case where the positions of the edge portions are made to be high, the reliability of the coil component 1 is improved because when the coil conductor 3 is disposed there, the distance between the conductor located on the bottom surface (that is, the outer electrode) and the coil conductor increases. The position of the upper surface 20 of the base portion 16 may be linearly or curvedly elevated to the edge of the base portion 16 from the edge of the protrusion portion 11 at which the protrusion portion 11 is in contact with the base portion 16. That is, the upper surface 20 of the base portion 16 may be flat or curved. Preferably, the position of the upper surface 20 of the base portion 16 is linearly elevated from the edge of the protrusion portion 11 to the edge of the base portion 16.

Figure 9:
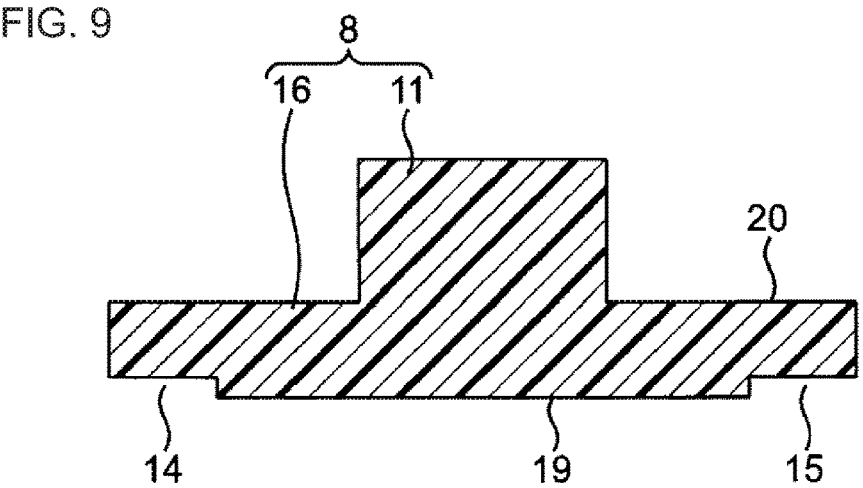
FIG. 9 is a sectional view of a magnetic base according to another exemplary embodiment.

In embodiments of the present disclosure, the edge of the upper surface 20 of the base portion 16 is preferably located higher than where the edge of the protrusion portion 11 which is in contact with the upper surface 20 as described above, but is not limited to this. For example, on the upper surface 20 of the base portion 16, the height where the edge of the protrusion portion 11 contacts the upper surface 20 may be equal to the height of the edge of the base portion 16, that is, the above-described t1 and t2 may be equal (FIG. 9). Alternatively, the edge of the base portion 16 may be located lower than the edge of the protrusion portion 11 on the upper surface 20, that is, t2 may be larger than t1.

In an aspect, the difference between t2 and t1 (t2−t1) may be preferably about 0.10 mm or more and 0.30 mm or less (i.e., from about 0.10 to about 0.30 mm), and more preferably about 0.15 mm or more and 0.25 mm or less (i.e., from about 0.15 to about 0.25 mm).

As described above, the base portion 16 of the magnetic base 8 has the grooves 14 and 15. The grooves 14 and 15 play a role in guiding the extension portions 24 and 25, respectively, of the coil conductor 3.

There is no particular limitation regarding the depth of each of the grooves 14 and 15. The depth is preferably less than or equal to the thickness of the conductor constituting the coil conductor 3, for example, preferably about 0.05 mm or more and 0.20 mm or less (i.e., from about 0.05 to about 0.20 mm), and may be about 0.10 mm or more and 0.15 mm or less (i.e., from about 0.10 to about 0.15 mm), for example.

The width of each of the grooves 14 and 15 is preferably more than or equal to the width of the conductor constituting the coil conductor 3, and more preferably more than the width of the conductor constituting the coil conductor 3.

In embodiments of the present disclosure, it is not always necessary that the magnetic base 8 have a groove 14 or 15.

As described above, in the magnetic base 8, the protrusion portion 11 is cylindrical. In such an aspect, the diameter of the protrusion portion 11 may be preferably about 0.1 mm or more and 2.0 mm or less (i.e., from about 0.1 to about 2.0 mm), and more preferably about 0.5 mm or more and 1.0 mm or less (i.e., from about 0.5 to about 1.0 mm). The protrusion portion 11 may be an elliptic cylinder. When force is applied to the protrusion portion 11, the elliptic cylinder shape distributes the force so that the protrusion portion 11 is hard to be broken. The length in the major axis in the cross section of the protrusion portion 11 may be in a range of 0.5 mm and 1.5 mm. The length in the minor axis in the cross section of the protrusion portion 11 may be in a range of 0.3 mm and 1.0 mm. The length ratio of the major axis to the minor axis may be in a range of 1.0 and 2.0 and preferably in a range of 1.2 and 1.7.

There is no particular limitation regarding the shape of the protrusion portion 11 when viewed from the upper surface side of the magnetic base 8, and the shape may be substantially circular, elliptical, or polygonal, e.g., triangular or quadrangular. Preferably, the shape may be the same in a plan view as the cross-sectional shape of the core portion of the coil conductor 3.

The height of the protrusion portion 11 is preferably more than or equal to the length of the core portion of the coil conductor 3, and may be preferably about 0.1 mm or more, more preferably about 0.3 mm or more, and further preferably about 0.5 mm or more. The height of the protrusion portion 11 may be preferably about 1.5 mm or less, more preferably about 0.8 mm or less, and further preferably about 0.5 mm or less. Here, "height of protrusion portion" refers to the height from the upper surface 20 of the base portion 16 in contact with the protrusion portion 11 to the top portion of the protrusion portion 11, and "length of core portion" refers to the length of the core portion along the central axis of the coil conductor 3. In the present disclosure, there is no particular limitation regarding the magnetic base as long as the protrusion portion is included in the structure.

Figure 8:
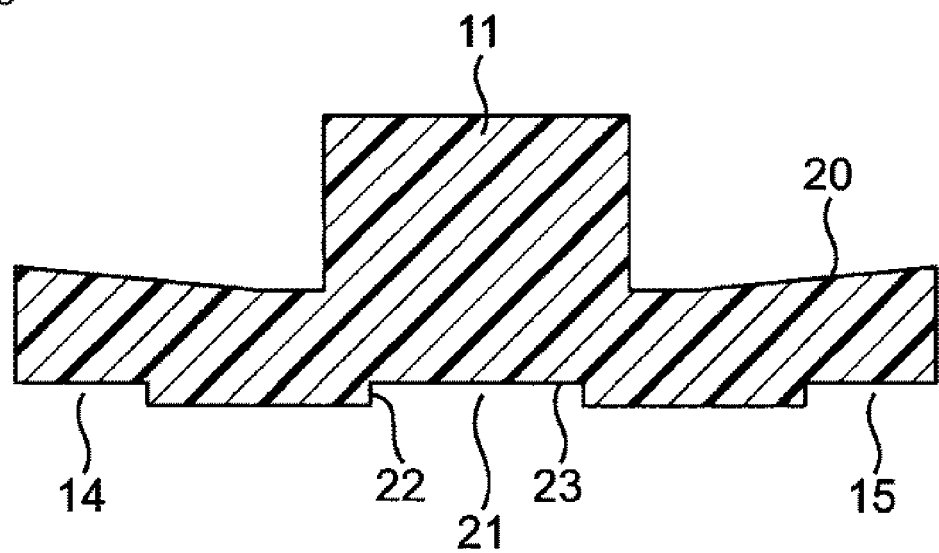
FIG. 8 is a sectional view of a magnetic base according to another exemplary embodiment.

In a preferred aspect, as shown in FIG. 8, the bottom surface of the magnetic base has a recessed portion 21 in at least part of an area opposite to the protrusion portion 11. In the case where the recessed portion 21 is located in at least part of the area opposite to the protrusion portion 11, the filling factor of metal particles in the protrusion portion 11 can be increased by compression molding.

There is no particular limitation regarding the shape of the recessed portion 21 when viewed from the bottom surface side of the magnetic base 8, and the shape may be substantially circular, elliptical, polygonal, e.g., triangular or quadrangular, or band-like.

In an aspect, the recessed portion 21 is located between the outer electrodes 4 and 5, and preferably in the entire area between the outer electrodes 4 and 5. In the case where the recessed portion is located between the outer electrodes 4 and 5, the path length (distance along the magnetic body surface) between the outer electrodes 4 and 5 increases, electrical insulation between the two outer electrodes can be enhanced, and the reliability is enhanced. In the case where the recessed portion 21 is located in the entire area between the outer electrodes 4 and 5, when mounting on a substrate or the like is performed, a minimum distance between the substrate or the like and the bottom surface of the magnetic portion can increase, and the reliability is enhanced. In addition, the protective layer 6 can be accommodated in the recessed portion and, therefore, the thickness of the coil component 1 is reduced compared with the case where the recessed portion is not located.

In an aspect, the recessed portion 21 is located in the entire area of the bottom surface opposite to the protrusion portion 11. In the case where the recessed portion 21 is located in the entire area of the bottom surface opposite to the protrusion portion 11 of the magnetic base, the filling factor of metal particles in the protrusion portion 11 can be increased by compression molding.

There is no particular limitation regarding the depth of the recessed portion 21. The depth may be preferably about 0.01 mm or more and 0.08 mm or less (i.e., from about 0.01 to about 0.08 mm), and more preferably about 0.02 mm or more and 0.05 mm or less (i.e., from about 0.02 to about 0.05 mm). Here, "depth of recessed portion" refers to the depth of the deepest position of the recessed portion 21 from the bottom surface 19.

There is no particular limitation regarding the width (width in the L direction) of the recessed portion 21. The width may be preferably about 0.3 mm or more and 0.8 mm or less (i.e., from about 0.3 to about 0.8 mm), and more preferably about 0.4 mm or more and 0.7 mm or less (i.e., from about 0.4 to about 0.7 mm). Here, "width of recessed portion" refers to the width of the widest position of the recessed portion 21.

The angle formed by a wall surface 22 and a bottom surface 23 of the recessed portion 21 may be preferably 90° or more, more preferably 100° or more, and further preferably 110° or more. The angle formed by the wall surface 22 and the bottom surface 23 of the recessed portion 21 may be preferably 130° or less, and more preferably 120° or less.

The magnetic outer coating 9 is disposed so as to cover the upper surface of the magnetic base 8, the coil conductor 3 located on the upper surface, the back surface of the magnetic base 8, the extension portions 24 and 25 of the coil conductor 3, which are located on the back surface, and both end surfaces of the magnetic base 8. That is, in the present embodiment, the front surface of the magnetic base 8, the bottom surface of the magnetic base 8, and the end portions 26 and 27 of the coil conductor 3, located on the bottom surface, are exposed at the magnetic outer coating 9.

In an aspect, the magnetic outer coating 9 covers side surfaces other than at least one side surface of the magnetic base 8, that is, three side surfaces. In this regard, the side surfaces generically refers to four surfaces, that is, the front surface, the back surface, and both the end surfaces. Therefore, at least one side surface of the magnetic base 8 is exposed at the magnetic outer coating 9.

In an aspect, the magnetic outer coating 9 covers the extension portions, which are located on the side surface of the magnetic base 8, of the coil conductor 3.

In the present disclosure, there is no particular limitation regarding the shape of the magnetic outer coating 9 as long as the magnetic outer coating covers the winding portion of the coil conductor 3.

The magnetic portion 2 is composed of a composite material including metal particles and a resin material.

There is no particular limitation regarding the resin material. Examples include thermosetting resins, e.g., epoxy resins, phenol resins, polyester resins, polyimide resins, and polyolefin resins. The resin materials are used alone or in combination.

There is no particular limitation regarding the metal material constituting the metal particles. Examples of the metal material include iron, cobalt, nickel, gadolinium, and alloys containing at least one of these. Preferably, the above-described metal material is iron or an iron alloy. Iron may be iron in itself or an iron derivative, e.g., a complex. There is no particular limitation regarding the iron derivative, and iron carbonyl that is a complex of iron and CO, preferably iron pentacarbonyl, is used. In particular, hard grade carbonyl iron (for example, hard grade carbonyl iron produced by BASF) having an onion skin structure (structure in which concentric sphere layers are formed from the center of a particle) is preferable. There is no particular limitation regarding iron alloys. Examples include Fe—Si alloys, Fe—Si—Cr alloys, and Fe—Si—Al alloys. The above-described alloys may further contain B, C, and the like as other secondary components. The content of the secondary component is not specifically limited and may be about 0.1 percent by weight or more and 5.0 percent by weight or less (i.e., from about 0.1 to about 5.0 percent by weight), and preferably about 0.5 percent by weight or more and 3.0 percent by weight or less (i.e., from about 0.5 to about 3.0 percent by weight). The above-described metal materials may be used alone or in combination. The metal material in the magnetic base 8 and the metal material in the magnetic outer coating 9 may be the same or be different from each other.

In an aspect, the metal particles of each of the magnetic base 8 and the magnetic outer coating 9 have an average particle diameter of preferably about 0.5 μm or more and 10 μm or less (i.e., from about 0.5 to about 10 μm), more preferably about 1 μm or more and 5 μm or less (i.e., from about 1 to about 5 μm), and further preferably about 1 μm or more and 3 μm or less (i.e., from about 1 to about 3 μm). In the case where the average particle diameter of the metal particles is set to be 0.5 μm or more, the metal particles are easily handled. In the case where the average particle diameter of the metal particles is set to be 10 μm or less, the filling factor of the metal particles can be increased and the magnetic characteristics of the magnetic portion 2 are improved. In a preferred aspect, the metal particles in the magnetic base and the metal particles in the magnetic outer coating may have the same average particle diameter. In other words, as above, the metal particles included in the magnetic portion 2 have an average particle diameter of preferably about 0.5 μm or more and 10 μm or less (i.e., from about 0.5 to about 10 μm), more preferably about 1 μm or more and 5 μm or less (i.e., from about 1 μm to about 5 μm), and further preferably about 1 μm or more and 3 μm or less (i.e., from about 1 to about 3 μm), as a whole. Regarding the particle size distribution of the metal particles, there may be one peak, there may be at least two peaks, or at least two peaks may overlap one another.

Here, the average particle diameter refers to an average of equivalent circle diameters of metal particles in a scanning electron microscope (SEM) image of a cross section of the magnetic portion. For example, the average particle diameter can be obtained by taking SEM photographs of a plurality of (for example, five) regions (for example, 130 μm×100 μm) in a cross section obtained by cutting the coil component 1, analyzing the resulting SEM images by using the image analysis software (for example, Azokun (registered trademark) produced by Asahi Kasei Engineering Corporation) so as to determine the equivalent circle diameters of 500 or more of metal particles, and calculating the average thereof.

In a preferred aspect, the CV value of the metal particles is preferably about 50% or more and 90% or less (i.e., from about 50% to about 90%), and more preferably about 70% or more and 90% or less (i.e., from about 70% to about 90%). The metal particles having such a CV value have relatively broad particle size distribution, relatively small particles can enter between relatively large particles and, thereby, the filling factor of the metal particles in the magnetic portion further increases. As a result, the magnetic permeability of the magnetic portion can further increase.

The CV value is a value calculated on the basis of the following formula, $$\text{CV value } (\%) = (\sigma/\text{Ave}) \times 100$$

wherein:

Ave is an average particle diameter; and

σ is a standard deviation of the particle diameter.

The metal particles of each of the magnetic base 8 and the magnetic outer coating 9 have an average particle diameter of preferably about 0.5 μm or more and 10 μm or less (i.e., from about 0.5 to about 10 μm), more preferably about 1 μm or more and 5 μm or less (i.e., from about 1 to about 5 μm), and further preferably about 1 μm or more and 3 μm or less (i.e., from about 1 to about 3 μm), and have a CV value of preferably about 50% or more and 90% or less (i.e., from about 50% to about 90%), and more preferably about 70% or more and 90% or less (i.e., from about 70% to about 90%). In further preferred aspect, the metal particles of the magnetic base and the metal particles of the magnetic outer coating may have the same average particle diameter.

The metal particles may be particles of a crystalline metal (or alloy) (hereafter also referred to as "crystalline particles" simply), may be particles of an amorphous metal (or alloy) (hereafter also referred to as "amorphous particles" simply), or may be particles of a metal (or alloy) having a nanocrystal structure (hereafter also referred to as "nanocrystal particles" simply). In this regard, "nanocrystal structure" refers to a structure in which fine crystals are precipitated in an amorphous metal (or alloy). In an aspect, the metal particles constituting the magnetic portion may be a mixture of at least two selected from crystalline particles, amorphous particles, and nanocrystal particles, and preferably a mixture of crystalline particles and amorphous particles or nanocrystal particles. In an aspect, the metal particles constituting the magnetic portion may be a mixture of crystalline particles and amorphous particles. In an aspect, the metal particles constituting the magnetic portion may be a mixture of crystalline particles and nanocrystal particles.

In the mixture of crystalline particles and amorphous particles or nanocrystal particles, there is no particular limitation regarding the mixing ratio of the crystalline particles to the amorphous particles or the metal particles having a nanocrystal structure (crystalline particles:amorphous particles or nanocrystal particles (mass ratio). The mixing ratio may be preferably about 10:90 to 90:10, more preferably 10:90 to 60:40, and further preferably 15:85 to 60:40.

In a preferred aspect, regarding the mixture of crystalline particles and amorphous particles, the crystalline metal particles may be iron, and preferably iron carbonyl (preferably hard grade carbonyl iron having an onion skin structure). The amorphous metal particles may be an iron alloy, e.g., an Fe—Si alloy, an Fe—Si—Cr alloy, or an Fe—Si—Al alloy, and preferably an Fe—Si—Cr alloy. In a further preferred aspect, the crystalline metal particles may be iron and, in addition, the amorphous metal particles may be an iron alloy, e.g., an Fe—Si alloy, an Fe—Si—Cr alloy, or an Fe—Si—Al alloy, and preferably an Fe—Si—Cr alloy.

In a preferred aspect, regarding the mixture of crystalline particles and nanocrystal particles, the crystalline metal particles may be iron, and preferably iron carbonyl (preferably hard grade carbonyl iron having an onion skin structure). Such a mixture further improves the magnetic permeability and further reduces a loss.

In a preferred aspect, the amorphous metal particles and the metal particles having a nanocrystal structure have an average particle diameter of preferably about 20 μm or more and 50 μm or less (i.e., from about 20 to about 50 μm), and more preferably about 20 μm or more and 40 μm or less (i.e., from about 20 to about 40 μm). In a preferred aspect, the crystalline metal particles have an average particle diameter of preferably about 1 μm or more and 5 μm or less (i.e., from about 1 to about 5 μm), and more preferably about 1 μm or more and 3 μm or less (i.e., from about 1 to about 5 μm). In a further preferred aspect, the amorphous metal particles and the metal particles having a nanocrystal structure have an average particle diameter of about 20 μm or more and 50 μm or less (i.e., from about 20 to about 50 μm), and preferably about 20 μm or more and 40 μm or less (i.e., from about 20 to about 40 μm), and the crystalline metal particles have an average particle diameter of about 1 μm or more and 5 μm or less (i.e., from about 1 to about 5 μm), and preferably about 1 μm or more and 3 μm or less (i.e., from about 1 to about 3 μm). In a preferred aspect, the amorphous metal particles and the metal particles having a nanocrystal structure have an average particle diameter larger than the average particle diameter of the crystalline metal particles. In the case where the average particle diameters of the amorphous metal particles and the metal particles having a nanocrystal structure are made to be larger than the average particle diameter of the crystalline metal particles, contribution of the amorphous metal particles and the metal particles having a nanocrystal structure to the magnetic permeability can be relatively increased.

In a preferred aspect, in the case where the Fe—Si—Cr alloy is used, it is preferable that the content of Si in the Fe—Si—Cr alloy be about 1.5 percent by weight or more and 14.0 percent by weight or less (i.e., from about 1.5 to about 14.0 percent by weight), for example, about 3.0 percent by weight or more and 10.0 percent by weight or less (i.e., from about 3.0 to about 10.0 percent by weight), and the content of Cr be about 0.5 percent by weight or more and 6.0 percent by weight or less (i.e., from about 0.5 to about 6.0 percent by weight), for example, about 1.0 percent by weight or more and 3.0 percent by weight or less (i.e., from about 1.0 to about 3.0 percent by weight). In particular, in the case where the content of Cr is set to be the above-described value, a passive layer is formed on the surface of the metal particle while degradation of the electrical characteristics is suppressed, and excessive oxidation of the metal particle can be suppressed.

The surfaces the metal particles may be covered with a coating film of an insulating material (hereafter also referred to as "insulating coating film" simply). In the case where the surface of the metal particle is covered with the insulating coating film, the specific resistance in the magnetic portion can increase.

The surface of the metal particle has to be covered with the insulating coating film to an extent that insulation between particles can be enhanced, and only part of the surface of the metal particle may be covered with the insulating coating film. There is no particular limitation regarding the shape of the insulating coating film, and the shape may be a mesh-like shape or a layered shape. In a preferred aspect, a ratio of a region covered with the insulating coating film in a metal particle to an entire surface of the metal particle may be 30% or more, preferably 60% or more, more preferably 80% or more, further preferably 90% or more, and particularly preferably 100%.

In an aspect, the insulating coating film of the amorphous metal particle and the metal particle having a nanocrystal structure and the insulating coating film of the crystalline metal particle are formed of different insulating materials. An insulating coating film formed of an insulating material containing silicon has high strength. Therefore, the strength of the metal particle can be enhanced by coating the metal particle with the insulating material containing silicon.

In an aspect, the surface of the crystalline metal particle may be covered with an insulating material containing Si. Examples of insulating materials containing Si include silicon-based compounds, e.g., $SiO_x$ (x is 1.5 or more and 2.5 or less, and $SiO_2$ is a representative).

In an aspect, the surfaces of the amorphous metal particle and the metal particle having a nanocrystal structure may be covered with an insulating material containing phosphoric acid or phosphoric acid residue (specifically a P=O group).

There is no particular limitation regarding phosphoric acid, and organic phosphoric acid denoted by $(R^2O)P(=O)(OH)_2$ or $(R^2O)_2P(=O)(OH)$ is used. In the formulae, each of $R^2$ represents a hydrocarbon group. Each of $R^2$ is a group having a chain length of preferably 5 atoms or more, more preferably 10 atoms or more, and further preferably 20 atoms or more. Each of $R^2$ is a group having a chain length of preferably 200 atoms or less, more preferably 100 atoms or less, and further preferably 50 atoms or less.

The above-described hydrocarbon group is preferably an alkyl ether group or a phenyl ether group that may include a substituent. Examples of substituents include an alkyl group, a phenyl group, a polyoxyalkylene group, a polyoxyalkylene styryl group, a polyoxyalkylene alkyl group, and an unsaturated polyoxyethylene alkyl group.

The organic phosphoric acid may be a form of phosphate. There is no particular limitation regarding a cation in such a phosphate. Examples thereof include ions of alkali metals, e.g., Li, Na, K, Rb, and Cs, ions of alkaline earth metals, e.g., Be, Mg, Ca, Sr, and Ba, ions of other metals, e.g., Cu, Zn, Al, Mn, Ag, Fe, Co, and Ni, $NH_4^+$, and an amine ion. Preferably, a counter cation is Lit, Nat, $K^+$, $NH_4^+$, or an amine ion.

In a preferred aspect, the organic phosphoric acid may be polyoxyalkylene styryl phenyl ether phosphoric acid, polyoxyalkylene alkyl ether phosphoric acid, polyoxyalkylene alkyl aryl ether phosphoric acid, alkyl ether phosphoric acid, or polyoxyethylene alkyl phenyl ether phosphoric acid or a salt thereof. There is no particular limitation regarding the method for coating with the insulating coating film, and the coating can be performed by using a coating method known to those skilled in the art, for example, a sol-gel method, a mechanochemical method, a spray-dry method, a fluidized bed granulating method, an atomization method, or a barrel-sputtering method.

In a preferred aspect, the surface of the crystalline metal particle may be covered with an insulating material containing Si and the surfaces of the amorphous metal particle and the metal particle having a nanocrystal structure may be covered with an insulating material containing phosphoric acid or phosphoric acid residue. In a further preferred aspect, the crystalline metal particles may be iron and the amorphous metal particles may be an iron alloy, e.g., an Fe—Si alloy, an Fe—Si—Cr alloy, or an Fe—Si—Al alloy, and preferably an Fe—Si—Cr alloy.

There is no particular limitation regarding the thickness of the insulating coating film, and the thickness may be preferably about 1 nm or more 100 nm or less (i.e., from about 1 to about 100 nm), more preferably about 3 nm or more and 50 nm or less (i.e., from about 3 to about 50 nm), and further preferably about 5 nm or more and 30 nm or less (i.e., from about 5 to about 30 nm), for example, about 10 nm or more and 30 nm or less or about 5 nm or more and 20 nm or less (i.e., from about 10 to about 30 nm or from about 5 to about 20 nm). The specific resistance of the magnetic portion can be further increased by further increasing the thickness of the insulating coating film. Meanwhile, the amount of the metal material in the magnetic portion can be further increased by further decreasing the thickness of the insulating coating film, the magnetic characteristics of the magnetic portion are improved, and the magnetic portion can be easily downsized.

In an aspect, the thicknesses of the insulating coating films of the amorphous metal particle and the metal particle having a nanocrystal structure are larger than the thickness of the insulating coating film of the crystalline metal particle.

In such an aspect, a difference in the thickness of the insulating coating film between the amorphous metal particle and the crystalline metal particle and between the metal particle having a nanocrystal structure and the crystalline metal particle is preferably about 5 nm or more and 25 nm or less (i.e., from about 5 to about 25 nm), more preferably about 5 nm or more and 20 nm or less (i.e., from about 5 to about 20 nm), and further preferably about 10 nm or more and 20 nm or less (i.e., from about 5 to about 20 nm).

In an aspect, the thicknesses of the insulating coating films of the amorphous metal particle and the metal particle having a nanocrystal structure are about 10 nm or more and 30 nm or less (i.e., from about 10 to about 30 nm), and the thickness of the insulating coating film of the crystalline metal particle is about 5 nm or more and 20 nm or less (i.e., from about 5 to about 20 nm).

In a preferred aspect, the average particle diameters of the amorphous metal particles and the metal particles having a nanocrystal structure are relatively large, the average particle diameter of the crystalline metal particles is relatively small, the insulating material covering the amorphous metal particle and the metal particle having a nanocrystal structure contains phosphoric acid, and the insulating material covering the crystalline metal particle contains Si. In the case where a particle having a relatively large particle diameter (amorphous particle or metal particle having a nanocrystal structure) is coated with the insulating material that contains phosphoric acid having a relatively low insulating property, the particle is electrically connected to other amorphous particles or metal particles having a nanocrystal structure during compression molding, and a cluster of particles electrically connected to each other may be formed. Consequently, the magnetic permeability of the magnetic portion increases. Meanwhile, in the case where a particle having a relatively small particle diameter (crystalline particle) is coated with the insulating material that contains Si having a relatively high insulating property, the insulating property of the entire magnetic portion can be enhanced. Consequently, high magnetic permeability and high insulation are easily ensured in combination.

In the magnetic portion 2, the filling factor of the metal particles in the magnetic base 8 is higher than the filling factor of the metal particles in the magnetic outer coating 9. In the case where the filling factor of the metal particles in the magnetic base, in particular, the filling factor of the metal particles in the protrusion portion of the magnetic base increases, the magnetic permeability of the magnetic portion increases and higher inductance can be obtained.

The filling factor of the metal particles in the magnetic base 8 may be preferably about 65% or more, more preferably about 75% or more, and further preferably about 85% or more. The upper limit of the filling factor of the metal particles in the magnetic base 8 is not specifically limited, and the filling factor may be, for example, about 98% or less, about 95% or less, about 90% or less, or about 85% or less. In an aspect, the filling factor of the metal particles in the magnetic base 8 may be about 65% or more and 98% or less (i.e., from about 65% to about 98%), about 65% or more and 85% or less (i.e., from about 65% to about 85%), about 75% or more and 98% or less (i.e., from about 75% to about 98%), or about 85% or more and 98% or less (i.e., from about 85% to about 98%).

The filling factor of the metal particles in the magnetic outer coating 9 may be preferably about 50% or more, more preferably about 65% or more, and further preferably about 75% or more. The upper limit of the filling factor of the metal particles in the magnetic outer coating 9 is not specifically limited, and the filling factor may be, for example, about 93% or less, about 90% or less, about 80% or less, or about 75% or less. In an aspect, the filling factor of the metal particles in the magnetic outer coating 9 may be about 50% or more and 93% or less (i.e., from about 50% to about 93%), about 50% or more and 75% or less (i.e., from about 50% to about 75%), about 65% or more and 93% or less (i.e., from about 65% to about 93%), or about 75% or more and 93% or less (i.e., from about 75% to about 93%).

In an aspect, the filling factor of the metal particles in the magnetic base 8 may be about 65% or more and 98% or less (i.e., from about 65% to about 98%), about 65% or more and 85% or less (i.e., from about 65% to about 85%), about 75% or more and 98% or less (i.e., from about 75% to about 98%), or about 85% or more and 98% or less (i.e., from about 85% to about 98%), and the filling factor of the metal particles in the magnetic outer coating 9 may be about 50% or more and 93% or less (i.e., from about 50% to about 93%), about 50% or more and 75% or less (i.e., from about 50% to about 75%), about 65% or more and 93% or less (i.e., from about 65% to about 93%), or about 75% or more and 93% or less (i.e., from about 75% to about 93%). For example, the filling factor of the metal particles in the magnetic base 8 may be about 65% or more and 98% or less (i.e., from about 65% to about 98%) and the filling factor of the metal particles in the magnetic outer coating 9 may be about 50% or more and 93% or less (i.e., from about 50% to about 93%), or the filling factor of the metal particles in the magnetic base 8 may be about 85% or more and 98% or less (i.e., from about 85% to about 98%) and the filling factor of the metal particles in the magnetic outer coating 9 may be about 75% or more and 93% or less (i.e., from about 75% to about 93%).

The filling factor refers to the proportion of the area of the metal particles in the SEM image of a cross section of the magnetic portion to the area of the SEM image. For example, regarding the filling factor, the coil component 1 is cut near the central portion of the product by a wire saw (DWS3032-4 produced by MEIWAFOSIS CO., LTD.) so as to expose a substantially central portion of the LT plane. The resulting cross section is subjected to ion milling (Ion Milling System IM4000 produced by Hitachi High-Technologies Corporation), and deburring so as to obtain a cross section for observation. The average particle diameter can be obtained by taking SEM images of a plurality of (for example, five) regions (for example, 130 μm×100 μm) in the cross section, analyzing the resulting SEM images by using the image analysis software (for example, Azokun (registered trademark) produced by Asahi Kasei Engineering Corporation) so as to determine the proportion of the area of the metal particles in the region.

The magnetic portion 2 (both or one of the magnetic base 8 and the magnetic outer coating 9) may further include particles of other substances, for example, silicon oxide (typically, silicon dioxide ($SiO_2$)) particles. In a preferred aspect, the magnetic base 8 may include particles of other substances. In the case where particles of other substances are included, the fluidity can be adjusted when the magnetic portion is produced.

The particles of other substances may have an average particle diameter of preferably about 30 nm or more and 50 nm or less (i.e., from about 30 to about 50 nm), and more preferably about 35 nm or more and 45 nm or less (i.e., from about 35 to about 45 nm). In the case where the average particle diameter of the particles of other substances is set to be within the above-described range, the fluidity can be enhanced when the magnetic portion is produced.

The filling factor of the particles of other substances in the magnetic portion 2 (both or one of the magnetic base 8 and the magnetic outer coating 9) may be preferably about 0.01% or more, for example, about 0.05% or more, and preferably about 3.0% or less, more preferably about 1.0% or less, further preferably about 0.5% or less, and further preferably about 0.1% or less. In the case where the filling factor of the particles of other substances is set to be within the above-described range, the fluidity can be further enhanced when the magnetic portion is produced.

The average particle diameter and the filling factor of the particles of other substances can be determined in the same manner as the average particle diameter and the filling factor of the metal particles.

In the present embodiment, as shown in FIG. 2 and FIG. 3, the coil conductor 3 is disposed such that the central axis of the coil conductor is arranged in the height direction (the T direction) of the coil component 1. The coil conductor 3 is spirally wound in two layers such that both ends of the coil conductor are located on the outer sides, respectively. That is, the coil conductor 3 is formed by subjecting the conducting wire containing a conductive material to α-winding. The coil conductor 3 is composed of a winding portion, in which the coil conductor is wound, and extension portions that extend from the winding portion. Each of the extension portions 24 and 25 has an end portion 26 and 27, respectively, located on the bottom surface of the magnetic portion 2. The coil conductor 3 is disposed such that the protrusion portion 11 is located in the core portion (a hollow portion located in the coil conductor 3 as described above) and the central axis of the coil conductor 3 is arranged in the height direction of the coil component 1. The extension portions 24 and 25 extend from the back surface to the bottom surface of the magnetic base 8.

Figure 10:
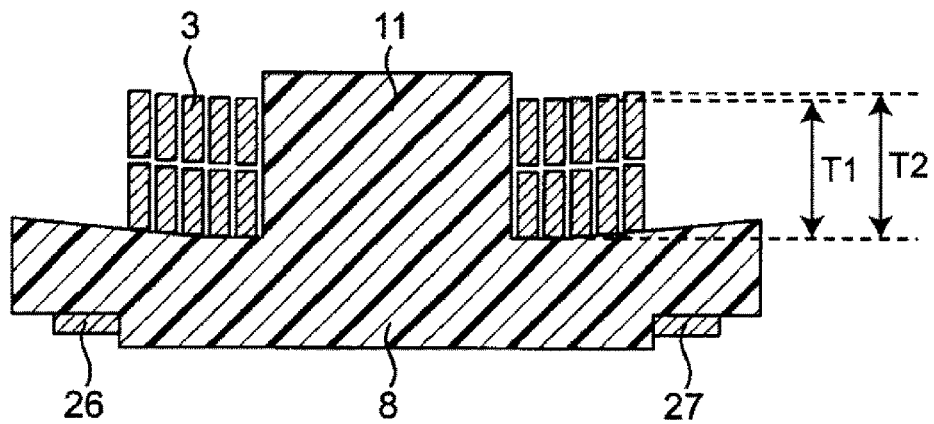
FIG. 10 is a sectional view of a magnetic base provided with the coil conductor of the coil component shown in FIG. 1.

In the coil conductor 3, a conducting wire constituting the outermost layer of the winding portion is located at a position higher than the position of a conducting wire constituting the innermost layer. In other words, the distance from the bottom surface of the coil component 1 to the conducting wire constituting the outermost layer of the wiring portion is larger than the distance from the bottom surface of the coil component 1 to the conducting wire constituting the innermost layer. That is, T2 shown in FIG. 10 is larger than T1. In the case where the position of the outer layer of the coil conductor is made higher, the distance between the coil conductor and the outer electrodes 4 and 5 can be increased and the reliability is enhanced. In addition, a large space can be ensured under the outer side layer of the coil conductor. Therefore, outer electrodes 4 and 5 can be formed in that portion and the profile of the coil component 1 is easily reduced. The position of the winding portion of the coil conductor may be linearly elevated toward the outside or may be curvedly elevated. That is, the side surface of winding portion may be a flat surface or may be a curved surface. Preferably, the side surface of the winding portion of the coil conductor may have the shape along the upper surface of the base portion of the magnetic base.

In an aspect, the difference between T2 and T1 (T2−T1: that is, the difference between the height of the winding constituting the outermost layer and the height of the winding constituting the innermost layer) may be preferably about 0.02 mm or more and 0.10 mm or less (i.e., from about 0.02 to about 0.10 mm), and more preferably about 0.04 mm or more and 0.10 mm or less (i.e., from about 0.04 to about 0.10 mm). T2 is the height of the winding constituting the outermost layer and T1 is the height of the winding constituting the innermost layer.

There is no particular limitation regarding the conductive material, and examples include gold, silver, copper, palladium, and nickel. Preferably, the conductive material is copper. The conductive material may be one or two or more selected from gold, silver, copper, palladium, and nickel.

The conducting wire constituting the coil conductor 3 may be a round wire or a rectangular wire, and preferably is a rectangular wire because the rectangular wire can be easily wound without space.

The thickness of the rectangular wire may be preferably about 0.14 mm or less, more preferably about 0.9 mm or less, and further preferably about 0.8 mm or less. In the case where the thickness of the rectangular wire decreases, the coil conductor becomes small even when the number of turns is the same, and there is an advantage in downsizing the entire coil component 1. In the case where the size of the coil conductor is the same, the number of turns can be increased. The thickness of the rectangular wire may be preferably about 0.02 mm or more, more preferably about 0.03 mm or more, and further preferably about 0.04 mm or more. The resistance of the conducting wire can be reduced by setting the thickness of the rectangular wire to be about 0.02 mm or more.

The width of the rectangular wire may be preferably about 2.0 mm or less, more preferably about 1.5 mm or less, and further preferably about 1.0 mm or less. In the case where the width of the rectangular wire decreases, the coil conductor can be made small, and there is an advantage in downsizing the entire component. The width of the rectangular wire may be preferably about 0.1 mm or more, and more preferably about 0.3 mm or more. The resistance of the conducting wire can be reduced by setting the width of the rectangular wire to be about 0.1 mm or more.

The ratio (thickness/width) of the thickness to the width of the rectangular wire may be preferably about 0.1 or more, more preferably about 0.2 or more, preferably 0.7 or less, more preferably 0.65 or less, and further preferably 0.4 or less.

In an aspect, the conducting wire constituting the coil conductor 3 may be coated with an insulating substance. In the case where the conducting wire constituting the coil conductor 3 is coated with an insulating substance, insulation between the coil conductor 3 and the magnetic portion 2 can be made more reliable. The insulating substance is not present on the portions that are connected to the outer electrodes 4 and 5 of the conducting wire, for example, in the present embodiment, the end portions of the coil conductor that extend to the bottom surface of the magnetic base 8, and the conducting wire is exposed.

The thickness of the coating film of the insulating substance, with which the conducting wire is coated, is preferably about 1 μm or more and 10 μm or less (i.e., from about 1 to about 10 μm), more preferably about 2 μm or more and 8 μm or less (i.e., from about 2 to about 8 μm), and further preferably about 4 μm or more and 6 μm or less (i.e., from about 4 to about 6 μm).

There is no particular limitation regarding the insulating substance, and examples include a polyurethane resin, a polyester resin, an epoxy resin, and a polyamide imide resin. A polyamide imide resin is preferable.

In an aspect, the magnetic portion 2 is located in the regions 28 and 29 between the end portions 26 and 27, respectively, of the coil conductor and the end surfaces of the magnetic portion 2 (see, FIG. 2). The width between the end portion of the coil conductor and the end surface of the magnetic portion is preferably 0.2 or more times and 0.8 or less times (i.e., from about 0.2 to about 0.8 times), and more preferably 0.4 or more times and 0.6 or more times (i.e., from about 0.4 to about 0.6 times) the width of the conducting wire constituting the coil conductor.

The outer electrodes 4 and 5 are disposed in the end portions of the bottom surface of the coil component 1. The outer electrodes 4 and 5 are disposed on the end portions 26 and 27, respectively, of the coil conductor 3 that extend to the bottom surface of the magnetic base 8. That is, the outer electrodes 4 and 5 are electrically connected to the end portions 26 and 27, respectively, of the coil conductor 3.

In an aspect, the outer electrodes 4 and 5 are not only disposed on the end portions 26 and 27 of the coil conductor 3 that extend to the bottom surface of the magnetic base 8 but may extend to other portions of the bottom surface of the coil component 1 beyond the end portions of the coil conductor.

In an aspect, the outer electrodes 4 and 5 are disposed in a region where the protective layer 6 is not located, that is, the entire region where the magnetic portion 2 or the coil conductor 3 are exposed with respect to the protective layer 6.

In an aspect, the outer electrodes 4 and 5 may extend to the end surfaces of the coil component 1.

In an aspect, the outer electrodes 4 and 5 may extend to other portions of the bottom surface of the coil component 1 beyond the end portions of the coil conductor and may further extend to the end surfaces of the coil component 1.

The outer electrodes 4 and 5 disposed on the portion other than the end portions of the coil conductor may be disposed on the magnetic portion 2 and may be disposed on the protective layer 6 described below.

In an aspect, the outer electrodes 4 and 5 extend over the protective layer 6 beyond the border between the protective layer and the region where the magnetic portion and the coil conductor are exposed. In a preferred aspect, the distance of extension of the outer electrode over the protective layer 6 may be preferably about 10 μm or more and 80 μm or less (i.e., from about 10 to about 80 μm), and more preferably about 10 μm or more and 50 μm or less (i.e., from about 10 to about 50 μm). Peeling of the protective layer 6 can be prevented by making the outer electrode to extend over the protective layer.

In an aspect, the outer electrodes 4 and 5 protrude from the surface of the coil component 1, the amount of protrusion is preferably about 10 μm or more and 50 μm or less (i.e., from about 10 to about 50 μm), and more preferably about 20 μm or more and 40 μm or less (i.e., from about 20 to about 40 μm).

There is no particular limitation regarding the thickness of the outer electrode, and the thickness may be, for example, about 1 μm or more and 100 μm or less (i.e., from about 1 to about 100 μm), preferably 5 μm or more and 50 μm or less (i.e., from about 5 to about 50 μm), and more preferably about 5 μm or more and 20 μm or less (i.e., from about 5 to about 20 μm).

The outer electrode 4, 5 is composed of a conductive material, preferably at least one metal material selected from Au, Ag, Pd, Ni, Sn, and Cu.

The outer electrode may be a single layer or a multilayer. In an aspect, in the case where the outer electrode is a multilayer, the outer electrode may include a layer containing Ag or Pd, a layer containing Ni, or a layer containing Sn. In a preferred aspect, the outer electrode includes a layer containing Ag or Pd, a layer containing Ni, and a layer containing Sn. Preferably, the above-described layers are disposed in the order of the layer containing Ag or Pd, the layer containing Ni, and the layer containing Sn from the coil conductor side. Preferably, the layer containing Ag or Pd may be a layer in which a Ag paste or a Pd paste has been baked (that is, a thermoset layer), and the layer containing Ni and the layer containing Sn may be plating layers.

The coil component 1 excluding the outer electrodes 4 and 5 is covered with the protective layer 6.

There is no particular limitation regarding the thickness of the protective layer 6, and the thickness may be preferably about 3 μm or more and 20 μm or less (i.e., from about 3 to about 20 μm), more preferably 3 μm or more and 10 μm or less (i.e., from about 3 to about 10 μm), and further preferably about 3 μm or more and 8 μm or less (i.e., from about 3 to about 8 μm). In the case where the thickness of the protective layer 6 is set to be within the above-described range, the insulating property of the surface of the coil component 1 can be ensured while an increase in the size of the coil component 1 is suppressed.

Examples of the insulating material constituting the protective layer 6 include resin materials, e.g., an acrylic resin, an epoxy resin, and a polyimide, having high electrical insulating properties.

In a preferred aspect, the protective layer 6 may contain Ti in addition to the insulating material. In the case where the protective layer contains Ti, a difference in the thermal expansion coefficient between the magnetic portion and the protective layer can be reduced. Even when expansion and shrinkage of the coil component 1 occur due to heating and cooling of the coil component 1, peeling of the protective layer from the magnetic portion can be suppressed by reducing the difference in the thermal expansion coefficient between the magnetic portion and the protective layer. Also, in the case where the protective layer contains Ti, plating does not easily extend over the protective layer during plating treatment for forming the outer electrodes 4 and 5, and extension of the outer electrodes over the protective layer can be adjusted.

There is no particular limitation regarding the content of Ti, and the content is preferably about 5 percent by mass or more and 50 percent by mass or less (i.e., from about 5 to about 50 percent by mass), and more preferably about 10 percent by mass or more and 30 percent by mass or less (i.e., from about 10 to about 30 percent by mass) relative to the entire protective layer.

In a further preferred aspect, the protective layer 6 may contain both or one of Al and Si in addition to the insulating material and Ti. In the case where the protective layer contains Al or Si, extension of plating over the protective layer can be suppressed.

There is no particular limitation regarding the contents of Al and Si, and each of the contents is preferably about 5 percent by mass or more and 50 percent by mass or less (i.e., from about 5 to about 50 percent by mass), and more preferably about 10 percent by mass or more and 30 percent by mass or less (i.e., from about 10 to about 30 percent by mass) relative to the entire protective layer.

The total of Ti, Al, and Si described above is preferably about 5 percent by mass or more and 50 percent by mass or less (i.e., from about 5 to about 50 percent by mass), and more preferably about 10 percent by mass or more and 30 percent by mass or less (i.e., from about 10 to about 30 percent by mass) relative to the entire protective layer.

In the present disclosure, the protective layer 6 is not indispensable and may not be provided.

The coil component 1 according to the present disclosure can be downsized while excellent electric characteristics are maintained. In an aspect, the length (L) of the coil component 1 according to an embodiment of the present disclosure is preferably about 0.9 mm or more and 2.2 mm or less (i.e., from about 0.9 to about 2.2 mm), and more preferably about 0.9 mm or more and 1.8 mm or less (i.e., from about 0.9 to about 1.8 mm). In an aspect, the width (W) of the coil component 1 according to the present disclosure is preferably about 0.6 mm or more and 1.8 mm or less (i.e., from about 0.6 to about 1.8 mm), and more preferably about 0.6 mm or more and 1.0 mm or less (i.e., from about 0.6 to about 1.0 mm). In a preferred aspect, the length (L) of the coil component 1 according to the present disclosure is preferably about 0.9 mm or more and 2.2 mm or less (i.e., from about 0.9 to about 2.2 mm) and the width (W) is 0.6 mm or more and 1.8 mm or less (i.e., from about 0.6 to about 1.8 mm), and preferably the length (L) is about 0.9 mm or more and 1.8 mm or less (i.e., from about 0.9 to about 1.8 mm) and the width (W) is 0.6 mm or more and 1.0 mm or less (i.e., from about 0.6 to about 1.0 mm). In an aspect, the height (or thickness (T)) of the coil component 1 according to an embodiment of the present disclosure is preferably about 0.8 mm or less, and more preferably about 0.7 mm or less.

Next, a method for manufacturing the coil component 1 will be described.

Initially, the magnetic base 8 is produced.

Production of Magnetic Base

The metal particles, the resin material, and other substances as necessary are mixed, and the resulting mixture is pressure-molded by using a mold. Subsequently, the magnetic base is produced by heat-treating the pressure-molded compact so as to cure the resin material.

The amorphous metal particles used have a median diameter (cumulative 50% equivalent diameter on a volume basis) of preferably about 20 μm or more and 50 μm or less (i.e., from about 20 to about 50 μm), and more preferably about 20 μm or more and 40 μm or less (i.e., from about 20 to about 40 μm). In a preferred aspect, the crystalline metal particles have a median diameter of preferably about 1 μm or more and 5 μm or less (i.e., from about 1 to about 5 μm), and more preferably about 1 μm or more and 3 μm or less (i.e., from about 1 to about 3 μm). In a further preferred aspect, the amorphous metal particles have a median diameter of preferably about 20 μm or more and 50 μm or less (i.e., from about 20 to about 50 μm), and more preferably about 20 μm or more and 40 μm or less (i.e., from about 20 to about 40 μm), and the crystalline metal particles have a median diameter of preferably about 1 μm or more and 5 μm or less (i.e., from about 1 to about 5 μm), and more preferably about 1 μm or more and 3 μm or less (i.e., from about 1 to about 3 μm).

The pressure of the pressure molding may be preferably about 100 MPa or more and 5,000 MPa or less (i.e., from about 100 to about 5,000 MPa), more preferably about 500 MPa or more and 3,000 MPa or less (i.e., from about 500 to about 3,000 MPa), and further preferably about 800 MPa or more and 1,500 MPa or less (i.e., from about 800 to about 1,500 MPa). In the case where the magnetic base is formed without the coil conductor deformation of the coil conductor does not occur even when the pressure of the pressure molding is high. Therefore, the pressure molding can be performed at a high pressure. The filling factor of the metal particles in the magnetic base can be increased by performing the pressure molding at a high pressure.

The temperature of the pressure molding can be appropriately selected in accordance with the resin material used and may be, for example, about 50° C. or higher and 200° C. or lower (i.e., from about 50° C. to about 200° C.), and preferably about 80° C. or higher and 150° C. or lower (i.e., from about 80° C. to about 150° C.).

The temperature of the heat treatment can be appropriately selected in accordance with the resin used and may be, for example, about 150° C. or higher and 400° C. or lower (i.e., from about 150° C. to about 400° C.), and preferably about 200° C. or higher and 300° C. or lower (i.e., from about 200° C. to about 300° C.).

Arrangement of Coil Conductor

The coil conductor is arranged on the magnetic base such that the protrusion portion of the magnetic base, produced as described above, is located in a core portion of the coil conductor so as to produce the magnetic base provided with the coil conductor. In this regard, both end portions of the coil conductor extend to the bottom surface of the magnetic base.

Regarding the method for arranging the coil conductor, the coil conductor separately produced by winding the conducting wire may be arranged on the magnetic base, or the coil conductor may be arranged by winding the conducting wire around the protrusion portion of the magnetic base so as to directly produce the coil conductor on the magnetic base. In the case where the coil conductor is separately produced and is arranged on the magnetic base, there is an advantage in simplifying the production step. In the case where the coil conductor is produced by winding the conducting wire around the protrusion portion of the magnetic base, the coil conductor can be made to come into closer contact with the magnetic base, and there is an advantage in decreasing the diameter of the coil conductor.

Production of Magnetic Outer Coating

The metal particles, the resin material, and other substances as necessary are mixed. The viscosity of the resulting mixture is appropriately adjusted by adding a solvent so as to produce a material for forming the magnetic outer coating.

The magnetic base provided with the coil conductor, produced as described above, is arranged into a mold. The material of the magnetic outer produced as described above is poured into the mold, and pressure molding is performed. The resulting compact is heat-treated so as to cure the resin material and, thereby, form the magnetic outer coating. As a result, the magnetic portion (element assembly), in which the coil conductor is embedded, is produced.

In an aspect, when the magnetic base is arranged into the mold, preferably at least one side surface of the magnetic base may be made to come into close contact with a wall surface of the mold. Preferably, the side surface of the magnetic base (the front surface of the magnetic base in the present embodiment) opposite to the side surface, on which the coil component 1 is located (the back surface of the magnetic base in the present embodiment), is made to come into close contact with the wall surface of the mold. As a result, the coil conductor located on the side surface can be reliably covered with the magnetic outer coating.

There is no particular limitation regarding the solvent, and examples include propylene glycol monomethyl ether (PGM), methyl ethyl ketone (MEK), N,N-dimethylformamide (DMF), propylene glycol monomethyl ether acetate (PMA), dipropylene glycol monomethyl ether (DPM), dipropylene glycol monomethyl ether acetate (DPMA), and γ-butyrolactone. Preferably, PGM is used.

The pressure of the pressure molding may be preferably about 1 MPa or more and 100 MPa or less (i.e., from about 1 to about 100 MPa), more preferably about 5 MPa or more and 50 MPa or less (i.e., from about 5 to about 50 MPa), and further preferably about 5 MPa or more and 15 MPa or less (i.e., from about 5 to about 15 MPa). In the case where molding is performed at such a pressure, an influence on the inside coil conductor can be suppressed.

The temperature of the pressure molding can be appropriately selected in accordance with the resin used and may be, for example, about 50° C. or higher and 200° C. or lower (i.e., from about 50° C. to about 200° C.), and preferably about 80° C. or higher and 150° C. or lower (i.e., from about 80° C. to about 150° C.).

The temperature of the heat treatment can be appropriately selected in accordance with the resin used and may be, for example, about 150° C. or higher and 400° C. or lower (i.e., from about 150° C. to about 400° C.), and preferably about 150° C. or higher and 200° C. or lower (i.e., from about 150° C. to about 200° C.).

Production of Protective Layer

A coating material is produced by adding, as necessary, Ti, Al, Si, and the like and an organic solvent to the insulating material and performing mixing. The resulting coating material is applied to the above-described element assembly and is cured so as to produce the protective layer.

There is no particular limitation regarding the coating method, and coating can be performed by spraying, dipping, or the like.

Production of Outer Electrode

The protective layer on the areas, on which the outer electrodes are formed, is removed. The removal exposes at least part of each of the end portions of the coil conductor that extends to the bottom surface of the magnetic base. The outer electrodes are formed on the areas at which the coil conductor is exposed. In the case where the coil conductor is coated with the insulating substance, the substance of the insulating coating film may be removed at the same time with removal of the protective layer.

There is no particular limitation regarding the method for removing the protective layer, and examples include physical treatment, e.g., laser irradiation and sand blast, and chemical treatment. Preferably, the protective layer is removed by laser irradiation.

There is no particular limitation regarding the method for forming the outer electrode. For example, CVD, electroplating, electroless plating, evaporation, sputtering, baking of electrically conductive paste, or the like, or a combination thereof is used. In a preferred aspect, the outer electrodes are formed by baking the electrically conductive paste and, thereafter, performing plating treatment (preferably electroplating).

The coil component 1 according to embodiments of the present disclosure is produced as described above.

Embodiments of the present disclosure provides a method for manufacturing a coil component including a magnetic portion that includes metal particles and a resin material, a coil conductor embedded in the magnetic portion, and outer electrodes electrically connected to the coil conductor. The magnetic portion includes a magnetic base having a protrusion portion and a magnetic outer coating, the coil conductor is arranged on the magnetic base such that the protrusion portion is located in a core portion of the coil conductor, and the magnetic outer coating is disposed so as to cover the coil conductor. The method includes the steps of (i) producing the magnetic base,
(ii) arranging the coil conductor on the magnetic base,
(iii) arranging the magnetic base provided with the coil conductor into a mold, pouring a material for forming the magnetic outer coating, and forming the magnetic outer coating by performing molding so as to produce the magnetic portion in which the coil conductor is embedded,
(iv) forming a protective layer on the magnetic portion in which the coil conductor is embedded, and
(v) removing the protective layer at predetermined positions and forming the outer electrodes on the predetermined positions.

Up to this point, the coil component and the method for manufacturing the same according to embodiments of the present disclosure have been described. However, the present disclosure is not limited to the above-described embodiments and modifications of the design can be made within the bounds of not departing from the gist of the present disclosure.

EXAMPLES

Examples 13

Production of Metal Particles.

Amorphous particles of an Fe—Si—Cr alloy (Si content of 7 percent by weight, Cr content of 3 percent by weight, B content of 3 percent by weight, C content of 0.8 percent by weight; median diameter (D50) of 50 μm) and crystalline particles of Fe (median diameter (D50) of 2 μm) were prepared as metal particles. In order to identify amorphous and crystalline, the particles were identified as amorphous or crystalline by using X-ray diffraction. A halo indicated amorphous, and a diffraction peak attributed to a crystal phase indicated that particles were crystalline.

The amorphous particles of the Fe—Si—Cr alloy were coated (thickness of 20 nm) with phosphoric acid by a mechanical coating method (MECHANO FUSION (registered trademark)). The crystalline particles of Fe were coated (thickness of 10 nm) with silicon dioxide ($SiO_2$) by a sol-gel method in which tetraethyl orthosilicate (TEOS) was used as a metal alkoxide.

Production of Magnetic Base

The above-described 80 mass % of Fe—Si—Cr alloy particles and 20 mass % of Fe particles were mixed. A material for forming the magnetic base was prepared by adding 3 parts by mass of epoxy thermosetting resin and 0.08 parts by mass of $SiO_2$ beads having a median diameter (D50) of 40 nm to 100 parts by mass of mixture powder of the Fe—Si—Cr alloy particles and the Fe particles and performing mixing by a planetary mixer for 30 minutes. The resulting material was pressure-molded (1,000 MPa and 100° C.) in a mold. After removal from the mold, heat curing was performed at 250° C. for 30 minutes so as to produce the magnetic base having a substantially track-like protrusion portion. The angle formed by a wall surface and a bottom surface of a recessed portion was set to be 120°. The average dimensions of the resulting five magnetic bases are shown in Table 1 described below.

surface of the mold. The material for forming the magnetic outer coating, produced as described above, was poured into the mold in which the magnetic base had been set. The magnetic outer coating was molded by applying a pressure of 10 MPa at 100° C. and was removed from the mold. The resulting compact was heat-cured at 180° C. for 30 minutes. After the curing, a $ZrO_2$-based ceramic powder was used as a media, and dry barrel polishing was performed so as to produce an element assembly of a coil component.

TABLE 1

| Example No. | External shape dimension (mm) | | | Difference in height between central portion and end portion (mm) t2 − t1 | Groove dimension (mm) | | Recessed portion dimension (mm) | | Protrusion portion dimension (mm) | |
|---|---|---|---|---|---|---|---|---|---|---|
| | Length | Width | Height | | Width | Depth | Width | Depth | Height | Major axis/minor axis |
| 1 | 2.06 | 1.66 | 0.68 | 0.20 | 0.30 | 0.10 | 0.80 | 0.03 | 0.48 | 1.08/0.85 |
| 2 | 1.65 | 0.85 | 0.62 | 0.15 | 0.30 | 0.06 | 0.48 | 0.03 | 0.44 | 0.86/0.51 |
| 3 | 1.15 | 0.85 | 0.52 | 0.10 | 0.20 | 0.01 | 0.28 | 0.02 | 0.34 | 0.61/0.51 |

Production of Coil Conductor

Three types of rectangular wires having mutually different thicknesses and width shown in Table 2 were prepared, and α-winding was performed so as to produce a coil conductor. The rectangular wire used was made of copper and was coated with polyamide imide having a thickness of 4 μm. The number of turns of each coil conductor was set to be 5.

TABLE 2

| Example No. | Rectangular wire dimension (mm) | | | Difference in height between inner side and outer side of winding portion (mm) T2 − T1 |
|---|---|---|---|---|
| | Width | Thickness | Ratio of thickness/width | |
| 1 | 0.21 | 0.13 | 0.619 | 0.06 |
| 2 | 0.19 | 0.08 | 0.421 | 0.06 |
| 3 | 0.15 | 0.02 | 0.133 | 0.04 |

Preparation of Material for Forming Magnetic Outer Coating

The 80 mass % of Fe—Si—Cr alloy particles and 20 mass % of Fe particles were mixed. A material for forming the magnetic outer coating was prepared by adding 3 parts by mass of epoxy thermosetting resin to 100 parts by mass of mixture powder of the Fe—Si—Cr alloy particles and the Fe particles, further adding propylene glycol monomethyl ether (PGM) serving as a solvent so as to have an appropriate viscosity, and performing mixing by a planetary mixer for 30 minutes.

Production of Magnetic Outer Coating

The core portion of the coil conductor was fit onto the protrusion portion of the magnetic base produced as described above. Both ends of the coil conductor were made to extend to the bottom surface of the magnetic base via the back surface along the grooves. The magnetic base provided with the coil conductor was set into the mold. At this time, the magnetic base was pushed to one side such that the front surface of the magnetic base came into contact with the wall Formation of Resin Coat (Protective Layer)

A coating material was prepared by adding a predetermined amount (20 percent by weight) of Ti to an insulating epoxy resin, and adding an organic solvent. The element assembly, produced as described above, was dipped into the resulting coating material so as to form the protective layer on the element assembly surface.

Formation of Outer Electrode

Some of the protective layer, produced as described above, was removed by laser so as to expose end portions of the coil conductor that extend to the bottom surface of the magnetic base and some of the magnetic base bottom surface adjacent to the end portions. The exposed portions were coated with an electrically conductive paste including a Ag powder and a thermosetting epoxy resin, and heat-curing was performed so as to form underlying electrodes. Thereafter, Ni and Sn films were formed by electroplating so as to form the outer electrodes.

In this manner, samples (coil components) of examples 1 to 3 were produced.

Evaluation (1) Magnetic Permeability μ

Regarding five samples of each of the examples, inductance was measured by an impedance analyzer (E4991A produced by Agilent Technologies; condition: 1 MHz, 1 Vrms, and ambient temperature of 20° C.±3° C.), and the magnetic permeability (μ) was calculated. The average of five values was determined and was assumed to be the magnetic permeability of the example. The results are shown in Table 4 described below.

(2) Filling Factor of Metal Particles in Magnetic Base

The sample of each example was cut near the central portion of the product by a wire saw (DWS3032-4 produced by MEIWAFOSIS CO., LTD.) so as to expose a substantially central portion of the LT plane. The resulting cross section was subjected to ion milling (Ion Milling System IM4000 produced by Hitachi High-Technologies Corporation), and sagging due to cutting was removed so as to obtain a cross section for observation. Regarding the filling factor of the magnetic base, positions that divide the base portion into 6 equal parts in the L-direction (5 positions indicated by Δ in FIG. 11) were photographed by SEM (region of 130 μm×100 μm), and regarding the filling factor of the magnetic outer coating, positions that divide the portion above the core portion into 6 equal parts in the L-direction (5 positions indicated by ○ in FIG. 11) were photographed by SEM. The area occupied by metal particles was determined from the resulting SEM photograph by using the image analysis software (Azokun (registered trademark) produced by Asahi Kasei Engineering Corporation). The proportion of the area of the metal particles in the entire measurement area was determined and the average value of the five positions was assumed to be the filling factor. The results are shown in Table 3 described below.

(3) Particle Size Distribution of Metal Particles

Figure 11:
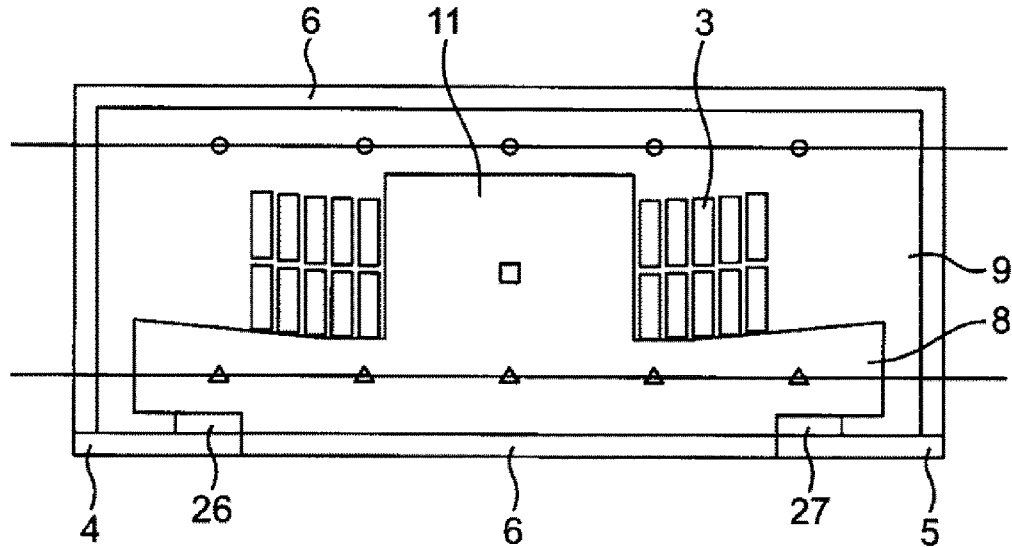
FIG. 11 is a diagram illustrating measurement positions for calculating the filling factor of metal particles in an example.

In the same manner as item (2), regarding the cross section of the sample, SEM photographs of 5 positions indicated by Δ in FIG. 11 were subjected to image analysis, equivalent circle diameters of arbitrary 500 metal particles were determined, and an average value of 5 positions was assumed to be the average particle diameter (Ave). Also, the standard deviation (σ) of the particle diameters was determined. From these results, the CV value ((σ)/Ave)×100) was determined. The results are shown in Table 3 described below.

(4) Thickness of Resin Coat (Protective Layer)

In the same manner as item (2), regarding the protective layer in the cross section of the sample, SEM photographs of arbitrary 5 positions were subjected to image analysis, the thickness of the protective layer was measured, and an average value of 5 positions was assumed to be the thickness of the protective layer. The thicknesses are shown in Table 4.

(5) Distance of Extension of Outer Electrode Over Protective Layer

In the same manner as item (2), regarding the border between the protective layer on the bottom surface side of the magnetic base and the outer electrode in the cross section of the sample, SEM photographs of arbitrary 2 positions were subjected to image analysis, the distance of extension of the outer electrode (plating electrode) over the protective layer was measured, and an average value of 2 positions was assumed to be the distance of extension over. The distances are shown in Table 4.

(6) Thickness of Insulating Coating Film of Metal Particles

In the same manner as item (2), the sample was processed and a cross section was exposed. A scanning transmission electron microscope (Model JEM-2200FS produced by JEOL LTD.) was used, and the composition of metal particles in a substantially central portion (a position indicated by □ in FIG. 11) of the core portion of the coil component in the cross section was analyzed so as to identify amorphous particles or crystalline particles. Three particles of each of the identified particles were photographed at a magnification of 300 k times and the thickness of the insulating coating was measured. An average value of 3 particles was determined and was assumed to be the thickness of the insulating coating film. Regarding every example and comparative example, the coating thicknesses are shown in Table 4.

TABLE 3

| Example No. | External shape dimension of coil component (mm) | | | Filling factor (%) | | Particle size distribution of metal particles | | |
|---|---|---|---|---|---|---|---|---|
| | | | | Magnetic base | Magnetic outer coating | Average particle diameter (μm) | Standard deviation (μm) | CV value (%) |
| | L | W | T | | | | | |
| 1 | 2.16 | 1.76 | 0.75 | 75 | 62 | 2.30 | 1.87 | 81 |
| 2 | 1.75 | 0.95 | 0.70 | 78 | 65 | 2.10 | 1.65 | 79 |
| 3 | 1.25 | 0.95 | 0.60 | 80 | 65 | 2.25 | 1.75 | 78 |

TABLE 4

| Example No. | Magnetic permeability μ | Thickness of protective layer (μm) | Distance of extension over (μm) | Thickness of coating (nm) | |
|---|---|---|---|---|---|
| | | | | Fe—Si—Cr alloy particle | Fe particle |
| 1 | 33.8 | 10 | 35 | 20 | 10 |
| 2 | 34.1 | 10 | 32 | 20 | 10 |
| 3 | 34.2 | 10 | 30 | 20 | 10 |

Examples 4 and 5

As shown in Table 5, samples (coil components) of examples 4 and 5 were produced in the same manner as example 1 except that the amount of epoxy resin, which was used for producing the magnetic base and the magnetic outer coating, added was set to be 2 parts by mass.

TABLE 5

| Example No. | External shape dimension (mm) | | | Difference in height between central portion and end portion (mm) t2 − t1 | Groove dimension (mm) | | Recessed portion dimension (mm) | | Protrusion portion dimension (mm) | |
|---|---|---|---|---|---|---|---|---|---|---|
| | Length | Width | Height | | Width | Depth | Width | Depth | Height | Major axis/minor axis |
| 4 | 2.06 | 1.66 | 0.68 | 0.20 | 0.30 | 0.10 | 0.80 | 0.05 | 0.48 | 1.08/0.85 |
| 5 | 2.06 | 1.66 | 0.68 | 0.20 | 0.30 | 0.10 | 0.80 | 0.08 | 0.48 | 1.08/0.85 |

Evaluation

Evaluation for examples 4 and 5 was performed in the same manner as examples 1 to 3. The results of the external shape dimensions of the coil component, the filling factor, and the particle size distribution of the metal particles are shown in Table 6, and the results of the magnetic permeability, the thickness of the protective layer, the distance of extension over, and the thickness of coating are shown in Table 7.

TABLE 6

| Example No. | External shape dimension of coil component (mm) | | | Filling factor (%) | | Particle size distribution of metal particles | | |
|---|---|---|---|---|---|---|---|---|
| | L | W | T | Magnetic base | Magnetic outer coating | Average particle diameter (µm) | Standard deviation (µm) | CV value (%) |
| 4 | 2.16 | 1.76 | 0.75 | 81 | 71 | 2.15 | 1.80 | 84 |
| 5 | 2.16 | 1.76 | 0.75 | 90 | 86 | 2.25 | 1.78 | 79 |

TABLE 7

| Example No. | Magnetic permeability µ | Thickness of protective layer (µm) | Distance of extension over (µm) | Thickness of coating (nm) | |
|---|---|---|---|---|---|
| | | | | Fe—Si—Cr alloy particle | Fe particle |
| 4 | 35.5 | 10 | 34 | 20 | 10 |
| 5 | 39.5 | 10 | 35 | 20 | 10 |

Comparative Example 1

The same types of Fe—Si—Cr alloy amorphous particles and Fe crystalline particles as those in examples 1 to 3 were prepared as the metal particles. The surfaces of these particles were coated in the same manner as examples 1 to 3.

A slurry was prepared by adding 3 parts by mass of epoxy resin to 100 parts by mass of mixture powder of 80 percent by mass of Fe—Si—Cr alloy particles and 20 percent by mass of Fe particles, further adding propylene glycol monomethyl ether (PGM) serving as a solvent so as to have an appropriate viscosity, and performing wet mixing. The resulting slurry was used, and magnetic sheets were produced by a doctor blade method.

A coil conductor of α-winding with the number of turns of 5 was produced by using the same rectangular wire as that in example 1. However, in the coil component according to comparative example 1, T2−T1 was 0.

Figure 12:
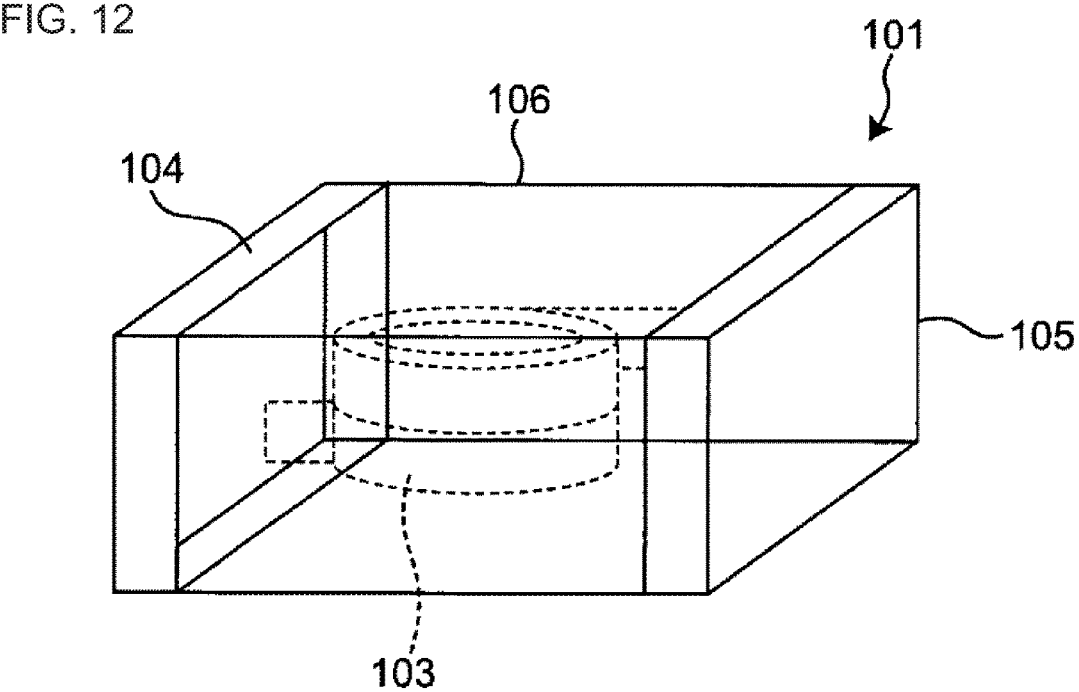
FIG. 12 is a schematic and perspective view of the coil component of a comparative example 1.

The coil conductor was interposed between two magnetic sheets, and pressed at a pressure of 10 MPa and at 100° C. The resulting multilayer body was cut into a piece by a dicer and was heat-cured by being maintained at 180° C. for 30 minutes. The coil conductor was made to extend to the end surfaces of the element assembly (refer to FIG. 12).

In the same manner as examples 1 to 3, barrel polishing and formation of the protective layer were performed. The protective layer in the areas, in which the outer electrodes were formed, was removed by laser so as to expose the end surfaces and some areas of the four surfaces around the end surfaces. The exposed portions were coated with an electrically conductive paste including a Ag powder and a thermosetting epoxy resin, and heat-curing was performed so as to form underlying electrodes. Thereafter, Ni and Sn films were formed by electroplating so as to form the outer electrodes.

In this manner, the sample (coil component) according to comparative example 1 was produced.

Evaluation

Magnetic Permeability

The magnetic permeability of comparative example 1 was measured in the same manner as item (1) in examples 1 to 3.

Filling Factor

Figure 13:
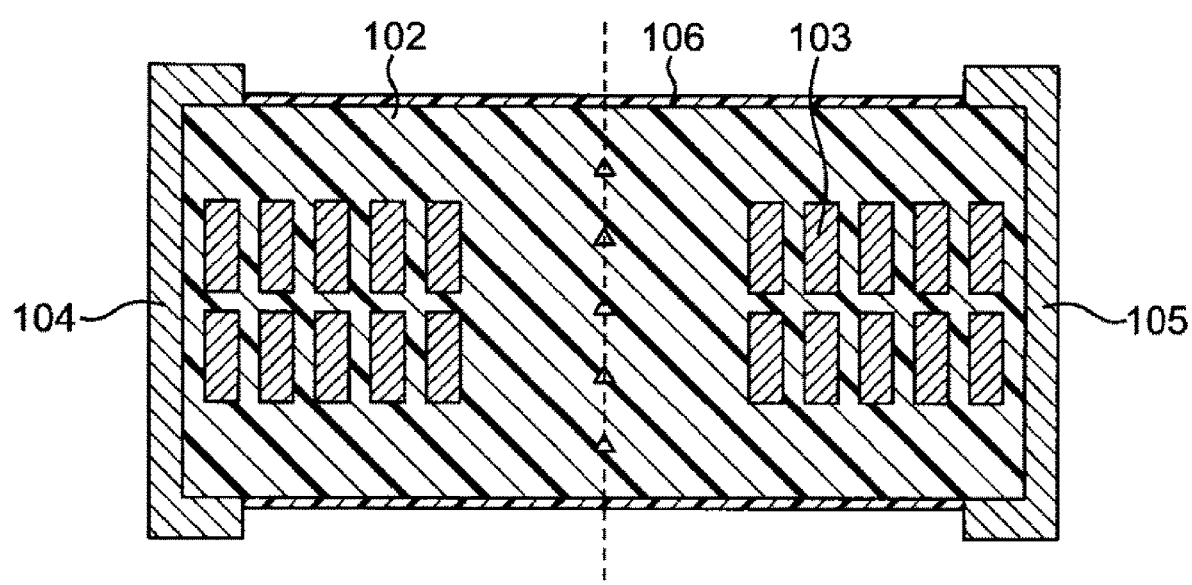
FIG. 13 is a diagram illustrating measurement positions for calculating the filling factor of metal particles in the comparative example 1.

In the same manner as item (2) in examples 1 to 3, the sample was processed and a cross section of the sample was exposed. Regarding positions that divide the cross section into 6 equal parts in the axis direction of the coil conductor (5 positions indicated by Δ shown in FIG. 13), the filling factors were calculated in the same manner as item (2) in examples 1 to 3. The results are shown in Table 8 described below.

TABLE 8

| Comparative example No. | External shape dimension of coil component (mm) | | | Filling factor (%) | Magnetic permeability μ |
|---|---|---|---|---|---|
| | L | W | T | | |
| 1 | 2.16 | 1.76 | 0.75 | 53 | 30.4 |

What is claimed is:

1. A coil component comprising:
a magnetic portion that includes metal particles and a resin material;
a coil conductor embedded in the magnetic portion and having a core portion; and
outer electrodes electrically connected to the coil conductor,
wherein:
the magnetic portion includes an outer coating and a magnetic base having a protrusion portion;
the magnetic base contains metal particles and a resin material;
the protrusion portion is inserted into the core portion;
the outer coating covers the coil conductor and is arranged over a top portion of the protrusion portion; and
a filling factor of the metal particles in the magnetic base is higher than a filling factor of the metal particles in the outer coating.

2. The coil component according to claim 1, wherein the filling factor of the metal particles in the magnetic base is 65% or more, and the filling factor of the metal particles in the outer coating is 50% or more.

3. The coil component according to claim 1, wherein the filling factor of the metal particles in the magnetic base is from 85% to 98%, and the filling factor of the metal particles in the outer coating is from 75% to 93%.

4. The coil component according to claim 1, wherein the magnetic base further contains silicon oxide particles.

5. The coil component according to claim 4, wherein an average particle diameter of the silicon oxide particles is from 35 nm to 50 nm.

6. The coil component according to claim 1, wherein an average particle diameter of the metal particles in the magnetic portion is from 1 μm to 3 μm, and a CV value of the metal particles in the magnetic portion is from 50% to 90%.

7. The coil component according to claim 1, wherein the coil conductor is in contact with the protrusion portion of the magnetic base.

8. The coil component according to claim 1, wherein ends of the coil conductor extend on a bottom surface of the magnetic base and the outer electrodes compose a bottom surface of the coil component.

9. The coil component according to claim 1, wherein:
the filling factor of the metal particles in the magnetic base is from 65% to 85%;
the filling factor of the metal particles in the outer coating is from 50% to 75%;
an average particle diameter of the metal particles in the magnetic portion is from 1 μm to 3 μm; and
a CV value of the metal particles in the magnetic portion is 50% or more and 90% or less.

10. The coil component according to claim 1, wherein:
the filling factor of the metal particles in the magnetic base is from 65% to 85%; and
the filling factor of the metal particles in the outer coating is from 50% to 75%.

11. The coil component according to claim 10, wherein the magnetic base further contains silicon oxide particles.

12. The coil component according to claim 1, wherein:
the filling factor of the metal particles in the magnetic base is from 65% to 85%; and
the filling factor of the metal particles in the outer coating is from 50% to 75%;
an average particle diameter of the metal particles in the magnetic portion is from 1 μm to 3 μm;
the magnetic base further contains silicon oxide particles; and
an average particle diameter of the silicon oxide particles is from 35 nm to 50 nm.

13. The coil component according to claim 1, wherein the magnetic base has a bottom surface including a recessed portion in an area opposite to the protrusion portion.

14. The coil component according to claim 1, wherein the magnetic base has bottom surface including grooves, and end portions of the coil conductor extend into the grooves.

15. The coil component according to claim 1, wherein the coil conductor is disposed adjacent to a surface of the magnetic base from which the protrusion portion extends and a vertical height of the surface increases with increasing distance along the surface from the protrusion.

16. The coil component according to claim 1, wherein the coil conductor is disposed adjacent to a surface of the magnetic base from which the protrusion portion extends and a vertical height of the surface remains constant with increasing distance along the surface from the protrusion.

17. The coil component according to claim 1, wherein:
the metal particles contain at least one selected from the group consisting of iron, Fe—Si alloy, Fe—Si—Cr alloy and Fe—Si—Al alloy,
the coil conductor is wound in α-winding form,
a length (L) of the coil component is about 0.9 mm or more and about 2.2 mm or less, and
a width (W) of the coil component is about 0.6 mm or more and about 1.8 mm or less.

18. The coil component according to claim 1, wherein:
a length (L) of the coil component is about 0.9 mm or more and about 1.8 mm or less, and
a width (W) of the coil component is about 0.6 mm or more and about 1.0 mm or less.

19. The coil component according to claim 1, further comprising a protective layer containing Ti and resin formed on the magnetic portion.

* * * * *